United States Patent [19]
Taniguchi et al.

[11] Patent Number: 5,719,486
[45] Date of Patent: Feb. 17, 1998

[54] GENERATING APPARATUS FOR PROVIDING DIFFERENT RATED OUTPUT VOLTAGES TO A PLURALITY OF ELECTRIC LOADS

[75] Inventors: Makoto Taniguchi, Obu; Atsushi Umeda, Anjo; Shin Kusase, Obu, all of Japan

[73] Assignee: Nippondenso Co., Ltd., Kariya, Japan

[21] Appl. No.: 634,033

[22] Filed: Apr. 17, 1996

[30] Foreign Application Priority Data

| Apr. 24, 1995 | [JP] | Japan | 7-098981 |
| May 31, 1995 | [JP] | Japan | 7-134219 |
| Dec. 21, 1995 | [JP] | Japan | 7-333811 |

[51] Int. Cl.$^6$ .................................................. H02J 7/14
[52] U.S. Cl. ........................ 322/28; 322/99; 322/24
[58] Field of Search ................... 322/25, 26, 27, 322/28

[56] References Cited

U.S. PATENT DOCUMENTS

| 4,084,126 | 4/1978 | Clements | 322/8 |
| 4,701,692 | 10/1987 | Takeuchi et al. | 322/90 |
| 4,985,670 | 1/1991 | Kaneyuki et al. | 322/28 |
| 5,093,583 | 3/1992 | Mashino et al. | 307/10.1 |
| 5,177,677 | 1/1993 | Nakata et al. | 363/89 |
| 5,355,071 | 10/1994 | Ishida et al. | 320/6 |
| 5,418,401 | 5/1995 | Kaneyuki | 307/10.1 |

FOREIGN PATENT DOCUMENTS

| 582 470 | 2/1994 | European Pat. Off. |
| 63-21156 | 6/1988 | Japan |

*Primary Examiner*—Thomas M. Dougherty
*Assistant Examiner*—Nicholas Ponomarenko
*Attorney, Agent, or Firm*—Cushman, Darby & Cushman IP Group of Pillsbury, Madison & Sutro LLP

[57] ABSTRACT

A generating apparatus includes a generator, a first and a second rectifiers, and a voltage regulator. The generator has three-phase star-connected armature windings which generate three-phase high-output voltage at phase-terminals and low-output voltage at a neutral point. The first rectifier is a three-phase full-wave rectifier connected between the phase-winding and a high-voltage load, and the second rectifier is a diode connected between the neutral point and a low-voltage load with a battery. The regulator regulates the high output voltage to energize the high-voltage load and, at the same time, the low-output voltage to become an optimum voltage level for charging battery. MOSFETs may be used for the first rectifier to short-circuit the armature windings thereby supplying them with leading currents which are respectively ahead of the high-output voltages, so as to increase the generator output power.

23 Claims, 28 Drawing Sheets

FIG. 3A SWITCH POSITION
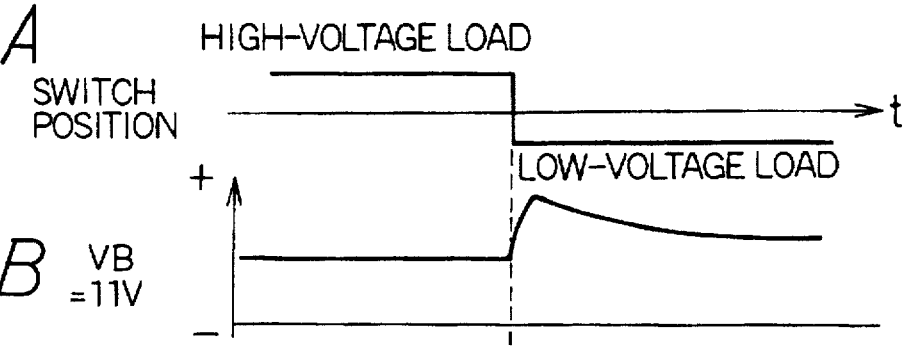
FIG. 3B $V_B$ =11V
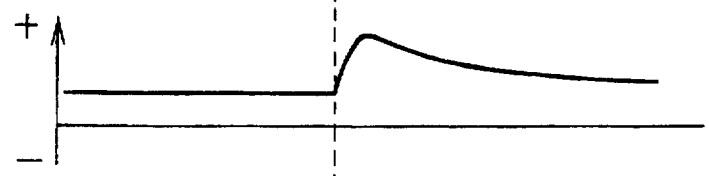
FIG. 3C $V_B$ =12V
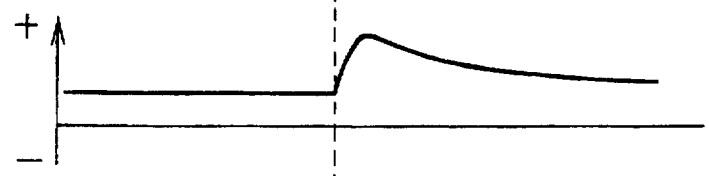
FIG. 3D $V_B$ =14V
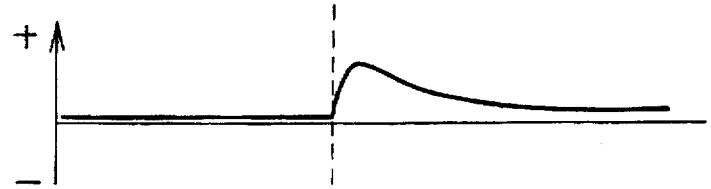
FIG. 3E
PRIOR ART
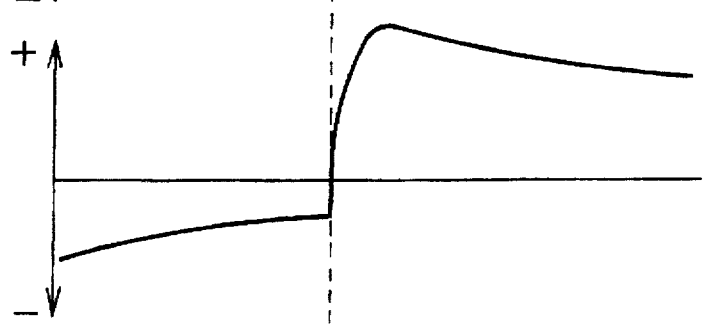

GENERATING APPARATUS FOR PROVIDING DIFFERENT RATED OUTPUT VOLTAGES TO A PLURALITY OF ELECTRIC LOADS

CROSS REFERENCE TO RELATED APPLICATION

The present application is based on and claims priority from Japanese Patent Applications No. Hei 7-98981, filed on Apr. 24, 1995, No. Hei 7-134219, filed on May 31, 1995, and No. Hei 7-333811, filed on Dec. 21, 1995, the contents of which are incorporated herein by reference.

BACKGROUND OF THE INVENTION

1. Field of the Invention

The present invention relates to a generating apparatus and, particularly, related to a generating apparatus for a vehicle which provides different rated output voltages to be supplied to a plurality of electric loads at the same time.

2. Description of the Related Art

In general, the rated voltage of a vehicle battery and the vehicle electric load is 12 V. However, an electric load having a higher rated voltage (hereinafter referred simply to as the high-voltage load) has been used recently. In order to energize the high electric load, a generation voltage changeover system has been adopted. The changeover system disconnects a generator from low voltage electric loads such as common 12V-rated-battery and/or electric loads before changing generation mode into a high-voltage-generation-mode.

For example, JP-Y2-63-21156 proposes a system, in which the neutral point of star-connected armature windings is grounded through one switch terminal of a change-over switch and a low voltage load, and the three-phase AC voltages coming out of respective output terminals of the three-phase star-connected armature windings are rectified by a three-phase full-wave rectifier so that the output terminals are grounded through the other switch terminal of the change-over switch and a high-voltage load. Thus, the changeover from one load to the other is carried out by the change-over switch.

However, since the low-voltage loads are energized by the battery while the alternator is generating the high-voltage in the above system, if the battery voltage is low when, for example, just after starting an engine, the low-voltage loads may not be sufficiently energized, and, an engine control unit (ECU) or other electronic device may not be supplied with sufficient electric power for normal operation.

U.S. Pat. No. 4,084,126 proposes a system in which when the battery voltage becomes lower than a fixed level, the alternator is switched to charge the battery automatically.

U.S. Pat. No. 5,418,401 proposes a system in which the high voltage is applied to the battery through a voltage converting circuit such as a DC-DC converter to prevent the battery voltage from decreasing while the high voltage is being generated.

However, the proposed system, in which the high-voltage generation mode is switched into the low-voltage generation mode when the battery voltage is detected to be low, may cause the high-voltage load much trouble. In order to avoid such trouble, a voltage converting circuit is required, resulting in larger size of the apparatus.

Since such generation voltage changeover system must be designed to generate the high output-voltage, the apparatus size increases. That is, since the generation voltage at a fixed rotational speed changes according to the magnetic flux and the number of turns of the armature windings, the high-voltage generation in a low speed range requires corresponding increases of cross-section of the magnetic core, number of turns of the field coil, cross-section of the field coil and number of turns of the armature windings, resulting in increases of the size and weight of the magnetic core, field coil and armature windings.

SUMMARY OF THE INVENTION

The present invention is made in view of the above problems, and has a main object of providing a generating apparatus which is able to supply high-voltage loads and low-voltage loads at the same time without increasing the size and weight of the alternator.

Another object of the present invention is to provide a generating apparatus for supplying a high-voltage load with a high-voltage electric power and a low-voltage load with low-voltage electric power, said apparatus comprising a multi-phase AC generator having a plurality of star-connected armature windings having respective phase-terminals and a neutral point, a full-wave rectifying means (hereinafter referred to as first rectifier) connected between said respective phase-terminals and said high-voltage load, and a second rectifier connected between said neutral point of said armature windings and said low-voltage load.

According to the above structure, an output voltage of each output terminal of the star-connected armature windings is rectified by the first rectifier and applied to a high-voltage load, and a voltage of the neutral point is rectified by another rectifying means (hereinafter referred to as second rectifier) to be applied to a low-voltage load.

Thus, both loads can be energized at different voltages at the same time only by adding the second rectifier, providing excellent effect.

The neutral point provides an AC voltage, the average voltage of which is about a half of the output-voltage (full-wave rectified voltage) of the first rectifier means and the basic frequencies of which are three times as many as frequencies of the phase voltage of the generator. The rectified voltage of the neutral point voltage is applied to the low-voltage load through a low-side switch and the low-voltage rectifying means when the high-voltage load is not energized. The DC-voltage of the first rectifier is supplied to the high-voltage load and the rectified voltage of the neutral point voltage is applied to the low-voltage load when the high-voltage load is energized. When the battery is connected in parallel with the low-voltage load, the battery is charged if the rectified voltage of the neutral voltage becomes higher than the battery voltage, or more precisely, if the rectified voltage becomes higher than composite voltage of the voltage drop of the second rectifier and the battery voltage. If the battery voltage lowers, conducting time of the second rectifier is increased to increase charge current; and if the battery voltage increases, the conducting time of the second rectifier is reduced to reduce charge current thereby to regulate the battery voltage.

Another object of the present invention is to provide a generating apparatus which, in addition, comprises a field coil disposed in said generator and means for regulating said high-output voltage. The output voltage of the second rectifier is regulated by voltage regulating means to a set low value when the high-voltage load is not energized, and the output voltage of the first rectifier is regulated to a set high value when the high-voltage load is energized. Thus, suitable low-voltage can be applied to the low-voltage load when the high-voltage load is not energized, and suitable high-voltage can be applied to the high-voltage load when the high-voltage load is energized.

A further object of the present invention is to provide a generating apparatus which, in addition to the above structure, comprises a switch for selectively connecting said first rectifier means to one of said high-voltage load and said low-voltage load. The first rectifier energizes selectively either one of the high-voltage load and the low-voltage load through the switch. The output voltage of the first rectifier is regulated to the high value by the field current control when the high-voltage load is selected, and to the low value when the low voltage load is selected. Thus, the low-voltage load can be energized when the high-voltage load is energized and low-voltage load can be energized when the high-voltage load is not energized by the first rectifier, so that the generator output voltage and the field current can be reduced thereby to reduce power loss such as joule heat, and also the system structure can be simplified since the output voltage can be detected by a single unit.

A further object of the present invention is to provide a generating apparatus, wherein said second rectifier comprises a diode which has an anode connected to said neutral point and a cathode connected to said low-voltage load.

A still further object of the present invention is to provide a generating apparatus, wherein said second rectifier comprises a semiconductor switching element, and said voltage regulating means makes said semiconductor switching element conductive when said neutral point becomes higher than a set voltage. Thus, power loss due to forward voltage drop of the PN junction of the diode can be avoided.

A still further object of the present invention is to provide a generating apparatus, in addition to the above structure, which comprises a voltage-setting diode connected between a terminal of said first rectifier and said neutral point. Therefore, minimum voltage of the neutral point is clamped by a diode to a voltage which is determined by a forward voltage drop of the diode lower than an output voltage of the low-voltage terminal of the first rectifier. Thus, the output power can be increased particularly at a high rotational speed.

Further, maximum voltage of the neutral point may be clamped by providing a diode to a voltage which is determined by a forward voltage drop of the diode higher than an output voltage of the high-voltage terminal of the first rectifier. Thus, the output power can be increased particularly at a high rotational speed.

Furthermore, the generator may have a permanent magnet for supplying magnetic field so that the field coil and field current supply means can be omitted. In this case, the DC output voltage is on-off-controlled by on-off-controlling means composed of a transistor to provide a set high voltage, and voltage fluctuation can be stabilized easily.

A still further object of the present invention is to provide a generating apparatus which comprises a multi-phase AC generator including a plurality of star-connected armature windings having respective phase-terminals and a neutral point, full-wave rectifying means connected between said respective phase terminals and said high-voltage load, second rectifying means connected between said neutral point and said low-voltage load, and leading current supplying means connected to one of said armature windings. Output voltage generated by a plurality of armature windings is full-wave-rectified by the full-wave rectifying means and applied to a high-voltage load, and voltage of a neutral point of the armature windings is rectified by a second rectifying means and supplied to a low-voltage load. The voltage regulating means on-off-controls the full-wave rectified voltage so that an optimum amount of leading current is supplied to the armature winding to regulate the generator output voltage.

Since the leading current is supplied to the armature windings, the high-output voltage generation is possible without providing a field coil and field-current-control-circuit. The leading current may not be supplied when neither the high-voltage load is energized nor the field current exceeds a set value. Accordingly, an increase of the rectified voltage of the second rectifier due to the leading current, and power loss due to joule heat caused by the leading current can be prevented. The leading current may be supplied when the high-voltage load is not energized and the field current exceeds a set value. Accordingly, only leading current control is necessary to increase the output power without increase of performance of the magnet field system even when a large amount of current supply to the low-voltage load is necessary. The above function is particularly effective at a low rotational speed where the generator output voltage is apt to decrease.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 3A, 3B, 3C, 3D and 3E are timing charts showing characteristics of output current of the apparatus shown in FIG. 1 and a conventional apparatus when position of a changeover switch is changed from a high-voltage load to a low voltage load;

FIGS. 17A, 17B, 17C and 17D are timing charts showing operation of the apparatus according to the eighth embodiment when the leading current is not supplied;

DETAILED DESCRIPTION OF THE PREFERRED EMBODIMENTS (First Embodiment)

Figure 1:
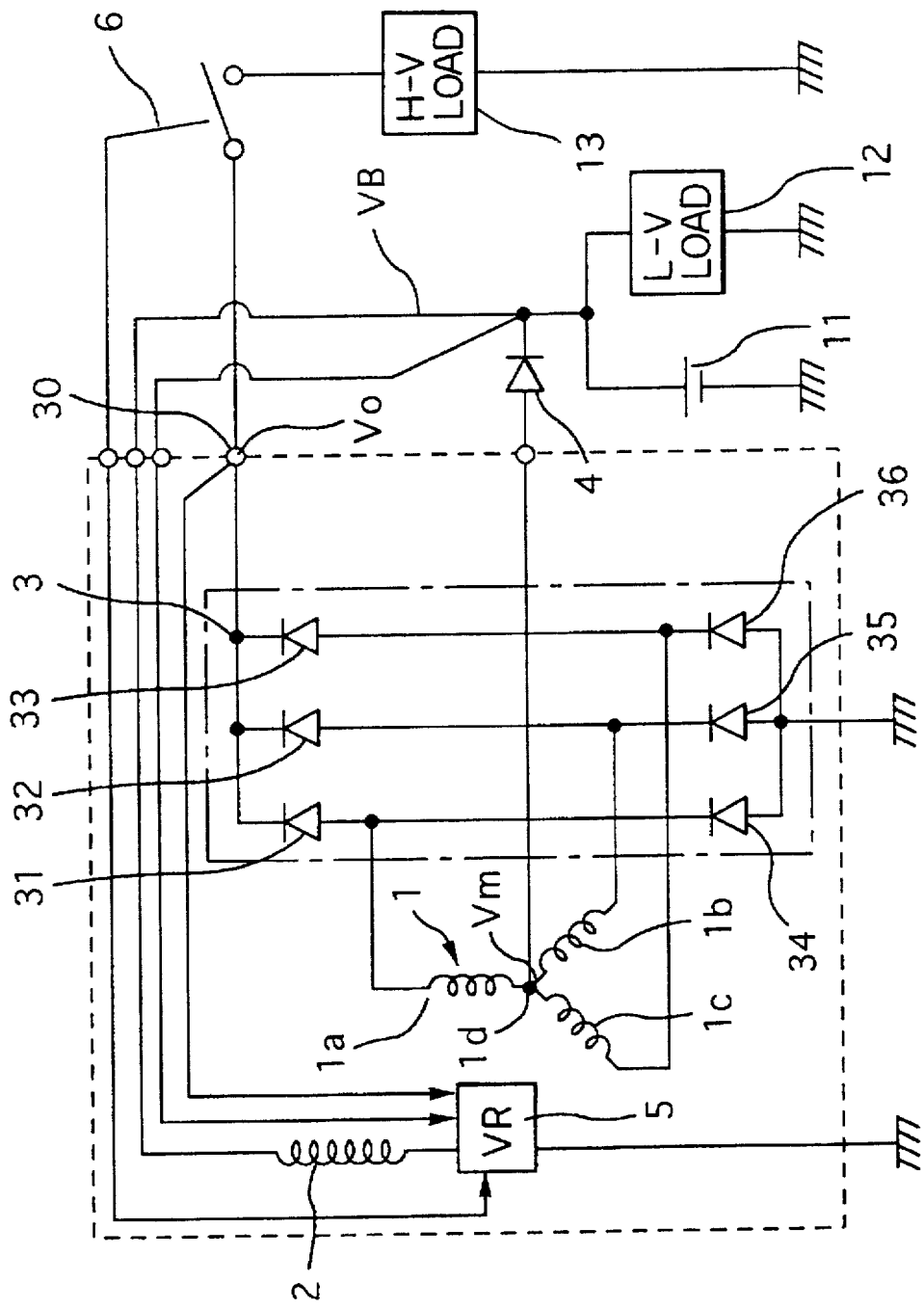
FIG. 1 is a circuit diagram showing a generating apparatus according to a first embodiment.

A generating apparatus according to a first embodiment is described with reference to a block diagram shown in FIG. 1.

The generation apparatus is composed of a three-phase synchronous generator 1, a three-phase full-wave rectifier 3 for rectifying alternator output current, a diode 4 and a controller 5 for controlling output voltage. The generator 1, the three-phase full-wave rectifier 3 and the voltage regulator 5 are formed into a unit which is called an alternator.

The generator 1 has star-connected armature windings 1a, 1b and 1c, and a field coil 2. Output voltages generated by the armature windings 1a, 1b and 1c are rectified by the three-phase full-wave rectifier 3, and field current supplied to the field coil 2 is controlled by the controller 5. When the field coil is supplied with the field current and rotated inside the armature windings 1a, 1b and 1c, three-phase AC voltage is induced in the armature windings 1a, 1b and 1c.

A high voltage terminal 30 of the three-phase full-wave rectifier 3 is connected to a high voltage load 13 through a high-voltage load switch 6, and a neutral point 1d of the armature windings 1a, 1b, 1c is connected to a low-voltage load 12 and a battery 11 through the diode 4.

The voltage regulator 5 has a microcomputer and PWM-controls the conducting ratio of the field current to generate necessary output voltage. For example, the voltage regulator 5 reads battery voltage VB and PWM-controls a built-in output switching transistor (not shown) so that the battery voltage VB becomes 13.5 V. The voltage of the high-voltage output terminal 30 of the three-phase full-wave rectifier 3 becomes about 24 V at the same time.

Operation of the apparatus is described next.

Just after an engine is started to drive the generator 1, the switch 6 is opened by an engine control unit ECU (not shown), and an output-voltage-setting register (not shown) of the voltage regulator 5 is set to provide the first-control-voltage 13.5 V. Three-phase symmetric AC voltage which has a vector center on the neutral point 1d is generated by the armature windings 1a, 1b and 1c. The voltage regulator 5 compares the battery voltage VB with the control voltage 13.5 V, and supplies the field current if the battery voltage VB is lower than the control voltage 13.5 V, or cut the field current if the battery voltage VB is higher.

In this embodiment, the battery 11 is charged from the neutral point 1d. Accordingly, the battery 11 is charged when voltage Vm of the neutral point 1d becomes higher than a voltage (about 14.3 V) which is given by adding a voltage drop (about 0.8 V) of the diode 4 to the battery voltage VB (13.5 V). When the battery voltage lowers, the field current is increased in the manner as described above to raise the voltage Vm of the neutral point 1d so that the charging current of the battery 11 increases. Conversely, when the battery voltage exceeds a certain voltage level, the field current is reduced to lower the voltage Vm of the neutral point 1d, thereby reducing the charging current of the battery 11.

When the switch 6 is closed by the ECU and the voltage regulator 5 detects closing of the switch 6, the output-voltage-setting transistor (not shown) provides the second control voltage 24 V. The voltage regulator 5 reads the full-wave rectified voltage Vo of the high voltage terminal 30 of the three-phase full-wave rectifier 3 instead of the battery voltage VB and compares it with the second control voltage 24 V. When the full-wave rectified voltage Vo is lower than the second control voltage 24 V, the field current is supplied and when the full-wave rectified voltage Vo is higher than the second control voltage, supply of the field current is cut. Thus, the high-voltage load 13 is supplied with the high voltage which is about 24 v on average. The generator 1 is designed so that the voltage Vm of the neutral point 1d of the armature windings 1a, 1b and 1c becomes about 14.3 V. As a result, the generator 1 can energize the high voltage loads 13 and charge the battery 11 at the same time.

Since each of the forward voltage drops of the diodes 31–36 is 0.8 V, the three-phase full-wave rectifier rectifies each full-wave current flowing through a circuit composed of one of the high-side diodes for an armature winding of the phase whose voltage becomes higher than 24.8 V and output voltages of the other windings and one of the low-side diodes for an armature winding of the phase whose voltage becomes lower than −0.8 V and output voltages of the other windings. The voltage of the neutral point 1d has frequencies of three times as high as the frequencies of each of the armature windings and an average voltage of about a half of the voltage Vo of the high-voltage terminal 30. When the neutral point voltage Vm becomes higher than 14.3 V, the battery 11 is charged and when the neutral point voltage Vm becomes lower than 14.3 V, the supply of charging current is stopped.

When the battery voltage VB lowers, the current supplied from the neutral point 1d to the battery 11 increases. Accordingly, the output voltage Vo of the high-voltage terminal 30 lowers so that the conducting ratio of the field current is enlarged to increase the output voltage, thereby increasing the charging current of the battery 11. On the other hand, when the battery voltage Vb increases excessively, the charging current of the battery 11 is reduced. As a result, the voltage to be applied to the high-voltage load 13 can be regulated to a desired level and the battery voltage VB can be also regulated within a fixed range by the field-current control according to the output voltage Vo.

Figure 2:
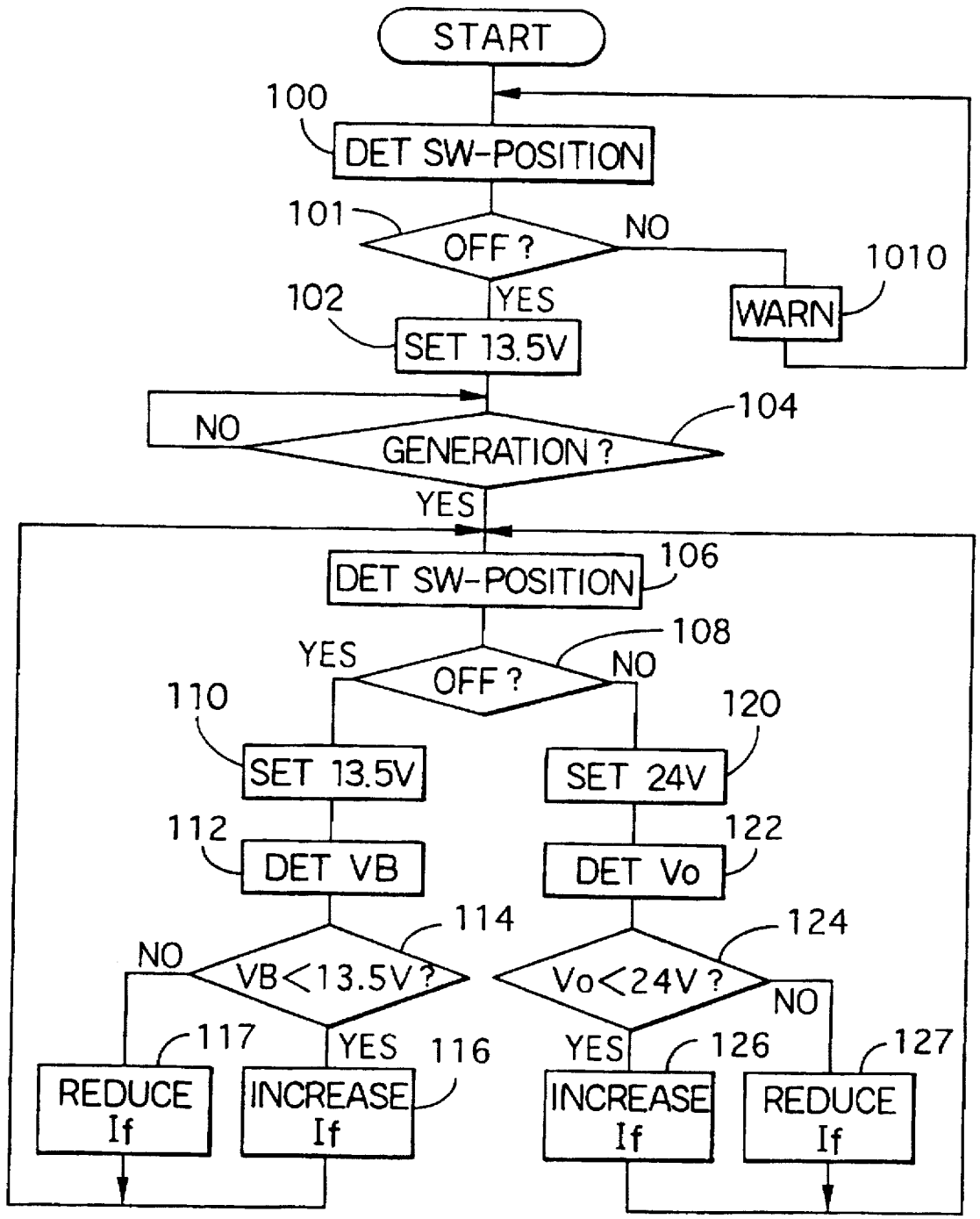
FIG. 2 is a flow chart showing operation of the apparatus shown in FIG. 1.

The operation of the first embodiment is described with reference to a flow chart shown in FIG. 2. The process composed of various steps shown in the flow chart is executed by the controller 5.

At the beginning, position of the switch 6 is detected in a step 100, and if the switch is turned on, a warning is issued in a step 1010 and the process returns to the step 100. If the switch 6 is turned off, the first control voltage 13.5 V is set in the built-in register in a step 102, and stands by until the engine is started in a step 104. When the engine is started, the position of the switch 6 is detected again in a step 106, and whether the switch 6 is on or off is examined in a step 108. Since the switch 6 is initially off, the register is set to provide the first control voltage 13.5 V in a step 110, and the battery voltage VB is read in a step 112 to examine whether the battery voltage VB is 13.5 V or not in a step 114. If it is lower, the field current is increased in a step 116, and if it is higher, the field current is decreased in a step 117 before returning to the step 106.

On the other hand, if the switch 6 is detected turning-on (YES), the register is set to provide the second control voltage 24 V in a step 120, and the output voltage Vo is detected in a step 122 and whether the output voltage Vo is lower than 24 V or not is examined in a satep 124. If it is lower than 24 V, the field current is increased in a step 126. If it is higher than 24 V, on the other hand, the field current is reduced in a step 127 before returning to the step 106.

An effect of the first embodiment is described with reference to FIGS. 3A–3E and with reference to results of an experiment in GRAPH 1.

In a conventional apparatus, the battery 11 is apt to discharge when the high-voltage is generated. On the other hand, in the apparatus according to the first embodiment, optimum charging for each battery voltage VB can be carried out.

According to the experiment, the generator 1 can supply a high-voltage load 13 which is rated at 24 V–1.8 KW with power of 1.8 KW at 24 V and at 3000 rpm. The battery charging current is 55 A when the battery voltage VB is 11 V, 40 A when VB is 12 V, 30 A when VB is 13 V and 10 A when VB is 14 V.

That is, when the output voltage Vo to be applied to the high-voltage load 13 is regulated to 24 V, the battery charging current can be controlled sufficiently according to the battery voltage VB.

[GRAPH 1]

| BATTERY VOLTAGE (V) | CHARGING CURRENT (A) | SUPPLY POWER (W) |
|---|---|---|
| 11 | 55 | 1800 |
| 12 | 40 | 1800 |
| 13 | 30 | 1800 |
| 14 | 10 | 1800 |

(Second Embodiment)

A second embodiment is described with reference to FIG. 4.

The second embodiment adopts a load-selecting switch 60 instead of the switch 6, and operation of the voltage regulator 5 is a little different.

A common terminal of the load-selecting switch 60 is connected to the output terminal 30 of the three-phase full-wave rectifier 3, another terminal thereof is connected to a higher voltage terminal of the high-voltage load 13 and another different terminal thereof is connected to the higher voltage terminal of the low-voltage load 12 and the battery 11. The field coil 2 is supplied with current from the high-voltage terminal 30 of the three-phase full-wave rectifier 3.

The voltage regulator 5 controls the field current according to the output voltage Vo of the common terminal of the load-selecting switch 60, that is, the output terminal 30. In other words, the voltage regulator 5 detects position of the load-selecting switch 60, and if the load-selecting switch 60 is connected to the low-voltage load 12, the built-in register is set to provide 13.5 V, and if the load-selecting switch is connected to the high-voltage load 13, the built-in register is set to provide 24 V.

Thus, when the high-voltage load 13 is energized, the battery 11 and the low-voltage load 12 are energized through the diode 4 as in the first embodiment, on the other hand, when the high-voltage load is not energized, the battery 11 and the low-voltage load 12 are supplied with the output voltage Vo through the load-selecting switch 60. Therefore, when the high-voltage is not connected, the field current can be reduced much more than the first embodiment.

Figure 5:
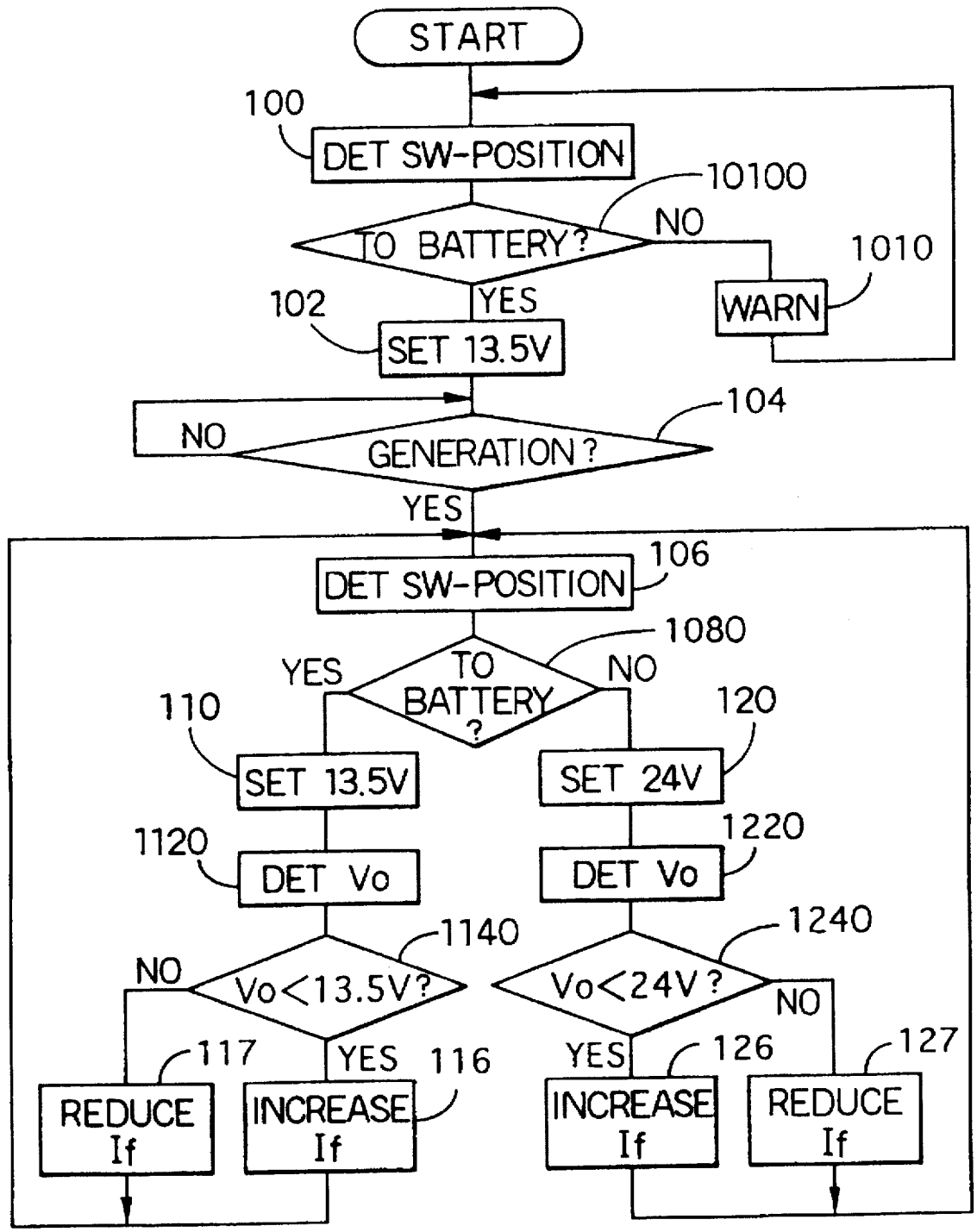
FIG. 5 is a flow chart showing operation of the apparatus shown in FIG. 4.

FIG. 5 shows a flow chart according to the second embodiment. This flow chart is almost the same as the flow chart shown in FIG. 2 except that the step 101 in FIG. 2 is replaced with a step 10100, and that the step 112 (in which the battery voltage VB is read) and the step 114 (in which the battery voltage VB is compared with the control voltage 13.5 V) are replaced by a step 1120 in which the output voltage Vo is read and by a step 1140 in which the output voltage Vo is compared with the control voltage 13.5 V.

In the step 10100, whether the load selecting switch 60 is connected to the battery 11 or not is examined. If the switch is connected to the battery 11, the process proceeds to the step 102 assuming that the generation mode is the low-voltage generation mode. If, on the other hand, the switch is connected to the high-voltage load 13 (NO), the process proceeds to a step 1010 to issue a warning.

According to the second embodiment, since the voltage regulator 5 only has to detect a single voltage input signal, the regulator can be made simple.

(Third Embodiment)

Figure 6:
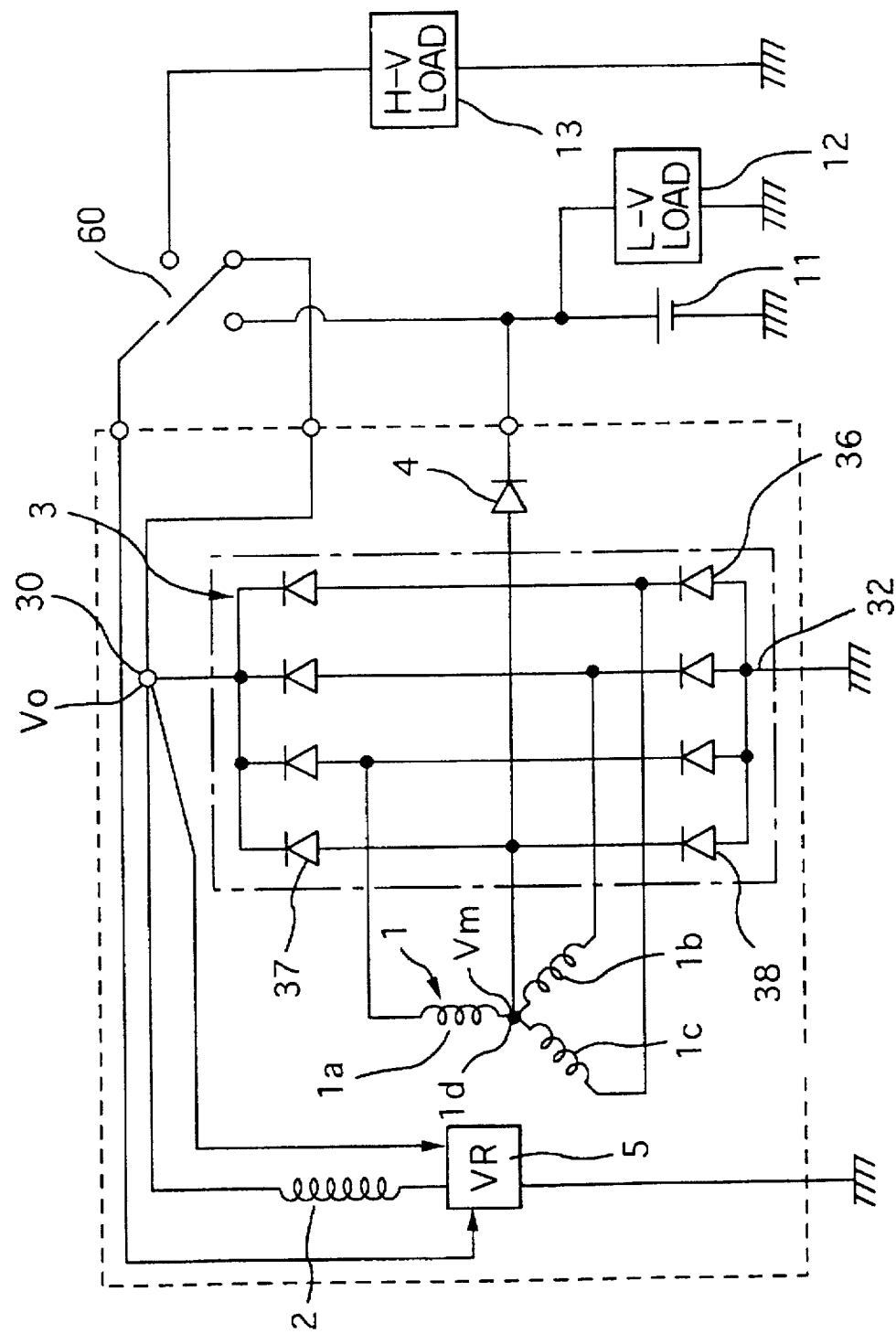
FIG. 6 is a circuit diagram showing a generating apparatus according to a third embodiment.

A third embodiment is described with reference to FIG. 6.

The third embodiment has neutral-point-voltage-setting diodes 37 and 38 added to the three-phase full-wave rectifier 3 of the second embodiment. The anode of the diode 37 is connected to the neutral point 1d and the cathode thereof is connected to the high-voltage terminal 30. The anode of the diode 38 is grounded and the cathode thereof is connected to the neutral point 1d. Operation of these diodes 37 and 38 are described as follows.

Figure 7:
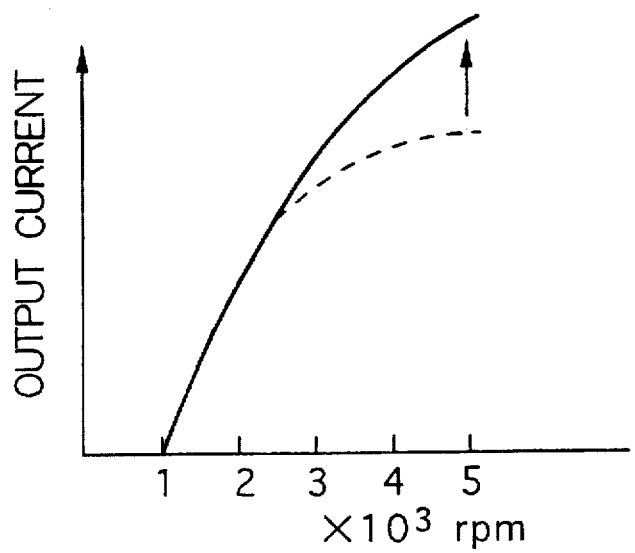
FIG. 7 is a graph showing an increase of generator output current relative to the rotational speed according to the apparatus shown in FIG. 6.

The diodes 37 and 38 are usually called exciter diodes which fix or clamp the voltage of the neutral point to a certain level and increase output power of a high speed range by about 10% as shown in FIG. 7.

That is, when the neutral point voltage Vm becomes 0.8 V higher than the output voltage Vo, the diode 37 becomes conductive so that a maximum of the neutral point voltage Vm is clamped at a voltage which is 0.8 V higher than the output voltage Vm. Similarly, when the neutral point voltage Vm becomes −0.8 V lower than the ground voltage (0 V), the diode 38 becomes conductive so that a minimum of the neutral point voltage Vm is clamped at a voltage which is 0.8 V lower than the ground voltage 0 V. Thus, current is supplied from the neutral point 1d through the diodes 37 and 38 to the loads, thereby increasing the output power in the high rotational speed range (which is generally called excitor effect).

When the high-voltage load 12 is energized, an exciter-current supply-circuit is formed to supply current through the diodes 4 and 38 to the battery 11 and the low-voltage load 12. Thus, the current supplied to the battery 11 and the low-voltage load 12 is increased by an amount equal to the exciter-current. The control process of this embodiment can be expressed by the same flow chart shown in FIG. 5.

(Fourth Embodiment)

Figure 8:
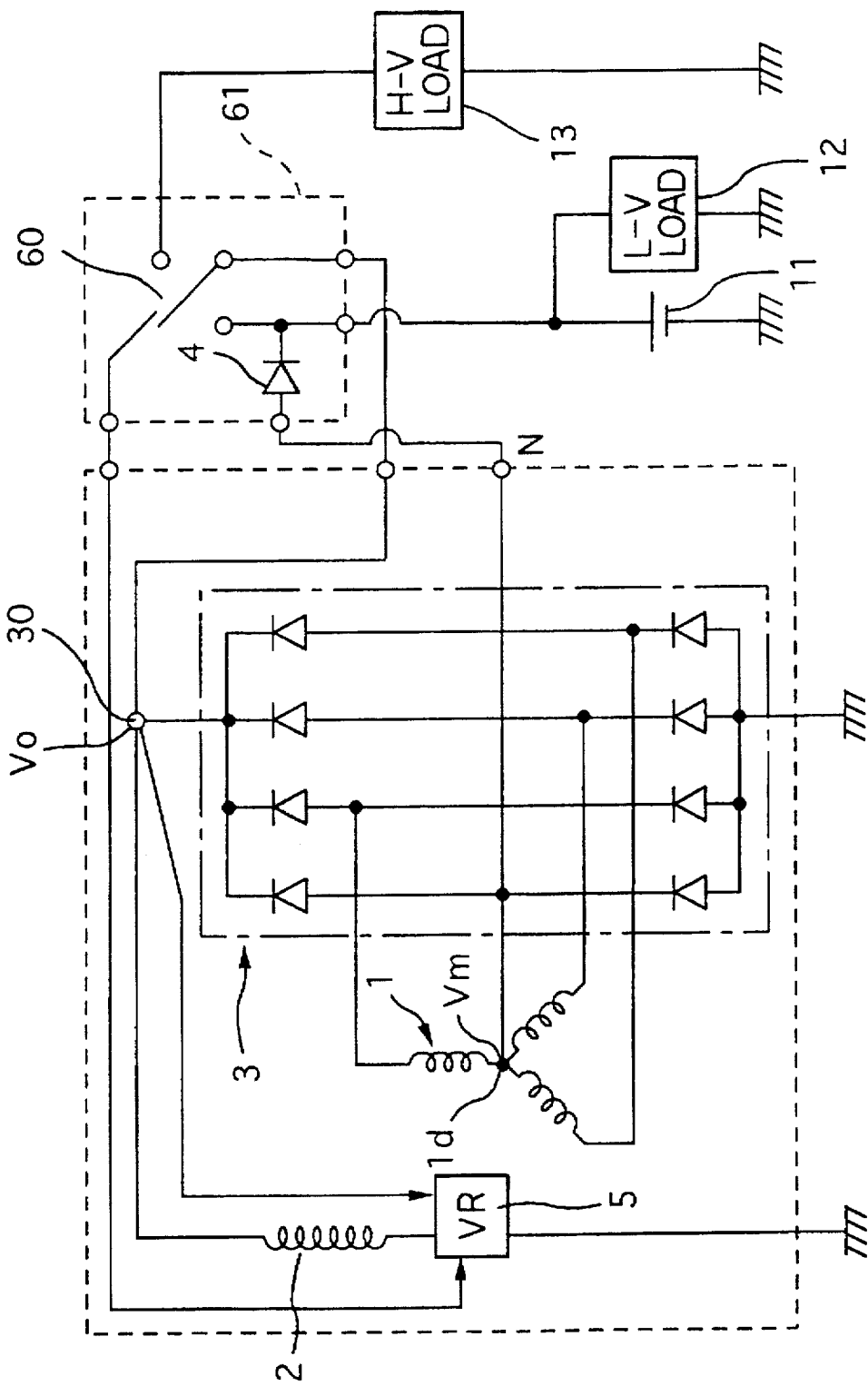
FIG. 8 is a circuit diagram showing a generating apparatus according to a fourth embodiment.

A fourth embodiment is described with reference to FIG. 8. In the fourth embodiment, the diode 4 of the second embodiment is removed from the alternator (which is enclosed by a broken line in FIG. 1) and put to a board 61 of the switch 60 and only a terminal N which connects the neutral point is provided in the alternator. Thus, the alternator, which is the same as the conventional type except for the terminal N, can be available to various vehicles.

(Fifth Embodiment)

Figure 9:
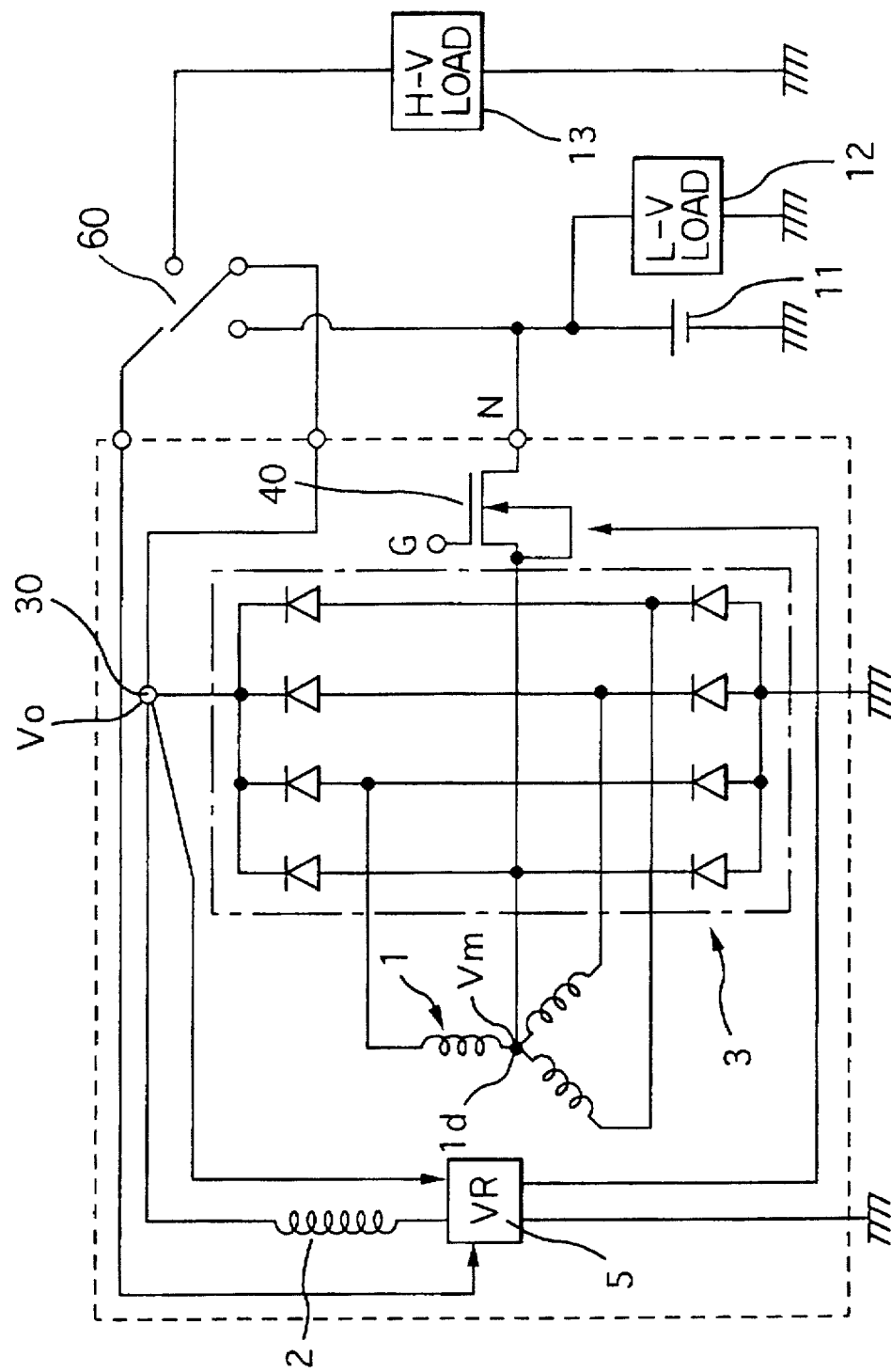
FIG. 9 is a circuit diagram showing a generating apparatus according to a fifth embodiment.
Figure 10:
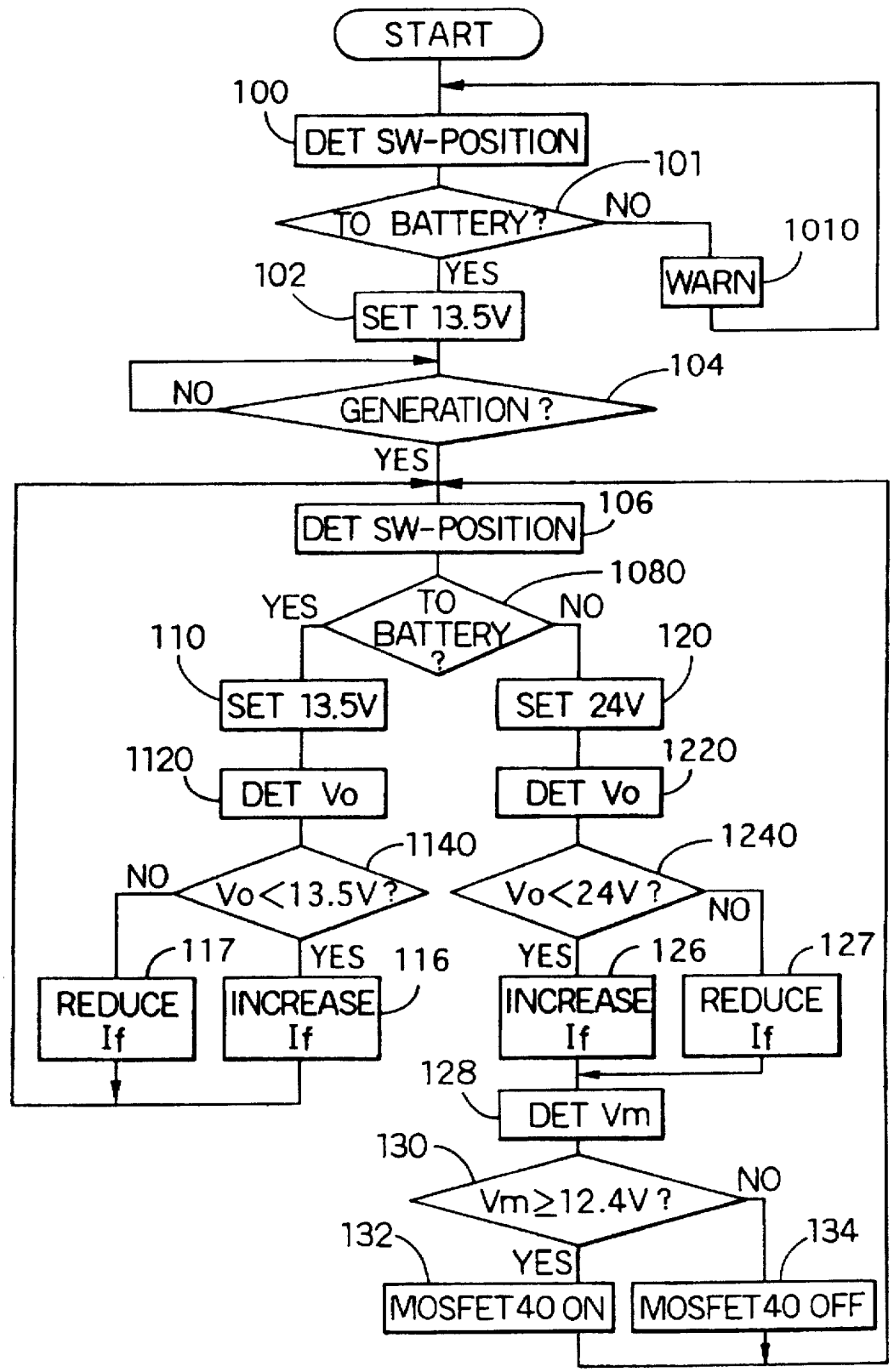
FIG. 10 is a flow chart showing operation of the generating apparatus according to the fifth embodiment.

A fifth embodiment is described with reference to FIG. 9 and FIG. 10. The fifth embodiment uses a MOSFET 40 as the low-voltage rectifying means instead of the diode 4. The MOSFET 40 is controlled by the controller 5. When the high-voltage load 13 is energized, whether the neutral point voltage Vm is higher than a battery voltage VB (12.4 V) or not is examined. If it is higher, the MOSFET 40 is turned on, on the other hand if it is not, the MOSFET 40 is turned off. Thus, the battery 11 can be charged by the MOSFET 40. The MOSFET 40 is preferably made of Si or SiC in order to enhance heat and high voltage resistance. The above steps are described later in more detail.

The P-well region of the MOSFET 40 is connected to the N-type-area on the neutral point 1d side, so that the battery voltage may not be applied to the neutral point 1d through the parasitic diode (not shown) composed of the above P-well region and the N-type area on the battery 11 side.

According to the fifth embodiment, electric power loss due to forward-voltage-drop of the P-N junction which is otherwise impossible to avoid can be eliminated, and the on-off timing control of the MOSFET 40 enables flexible and much more speedy current supply control than the field current control. For example, the current supply control as described above is especially effective to reduce vibration of the engine when the loads of the generator are switched on and off at a high frequency.

Operation of the fifth embodiment is further described with reference to a flow chart shown in FIG. 10.

This flow chart has steps 128–134 which are executed after the steps 126 and 127 of the flow chart shown in FIG. 5.

In the step 128, the neutral point voltage Vm is read. If Vm >12.4 V in a step 130, the MOSFET 40 is turned ON in a step 132, otherwise, the MOSFET 40 is turned OFF 134 and the process returns to the step 106. Thus, the battery 11 is charged until the battery voltage becomes 12.4 V if the current supplied to the low-voltage load 12 is neglected.

(Sixth Embodiment)

Figure 11:
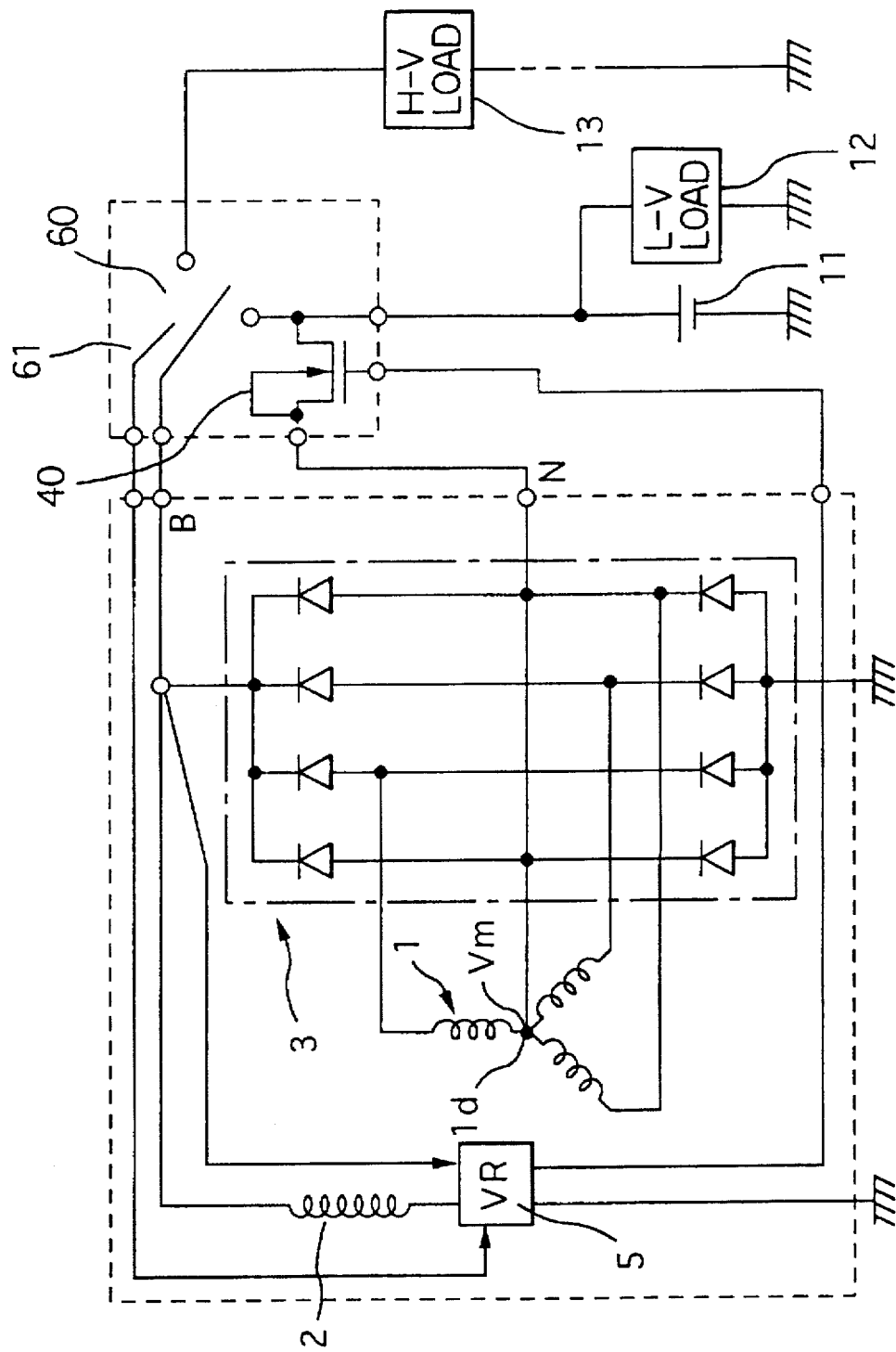
FIG. 11 is a circuit diagram showing a generating apparatus according to a sixth embodiment.

A sixth embodiment is described with reference to FIG. 11. This embodiment replaces the diode 4 of the fourth embodiment shown in FIG. 8 with the MOSFET 40.

The operation of the MOSFET 40 by itself is the same as the MOSFET 40 of the sixth embodiment.

Thus, the same effect as described for the fifth embodiment can be obtained and a common type alternator with reduced number of parts can be manufactured for various use.

(Seventh Embodiment)

Figure 12:
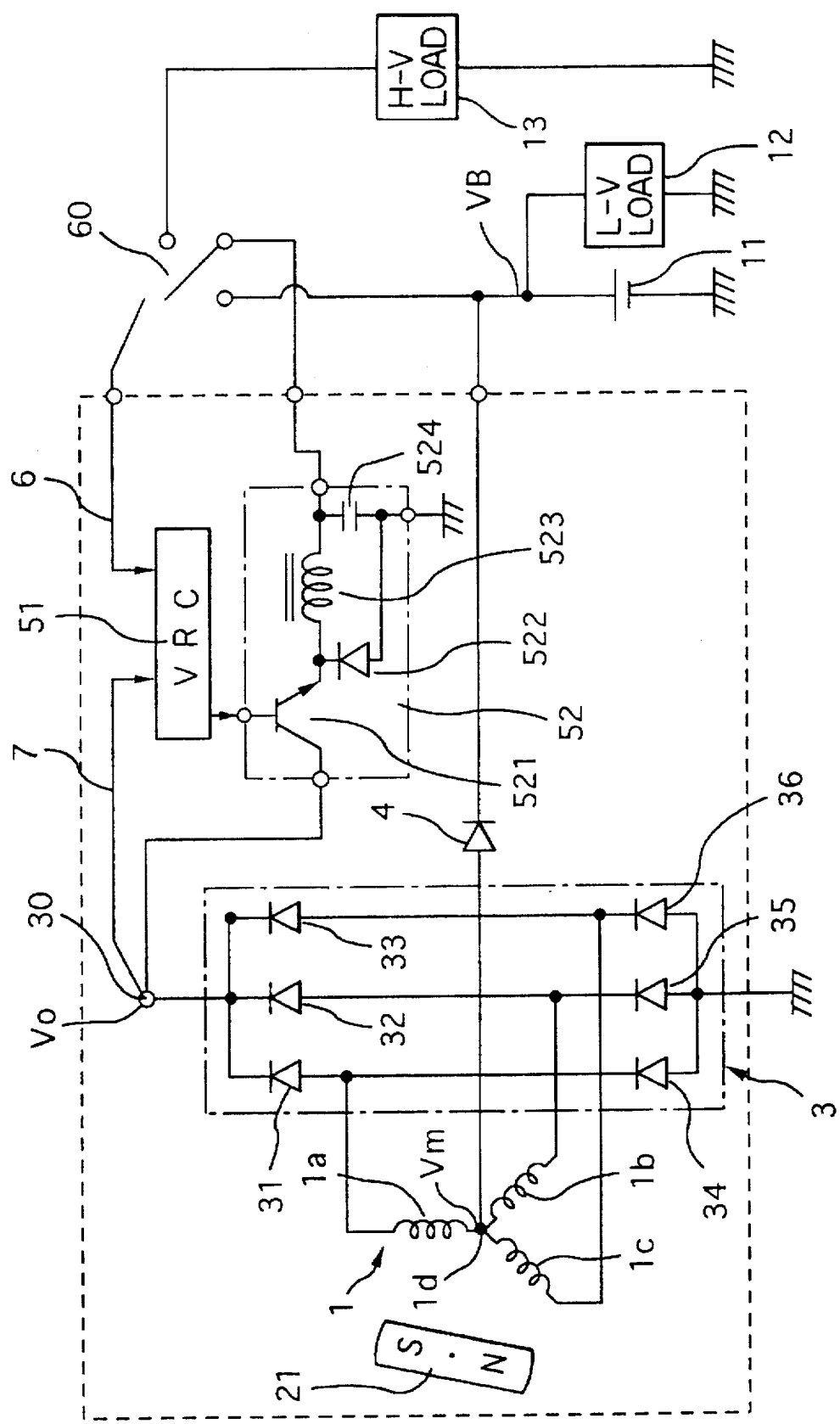
FIG. 12 is a circuit diagram showing a generating apparatus according to a seventh embodiment.

A seventh embodiment is described with reference to FIG. 12. This embodiment replaces the field-coil-type rotor of the generator 1 composed of the field coil 2 of the second embodiment (shown in FIG. 4) with a magnet-type rotor 21 composed of permanent magnets and replaces the regulator 5 which controls the field current to be supplied to the field coil 2 with a chopper circuit 52 and a regulator circuit 51.

The chopper circuit 52 is composed of an npn transistor 521 having a collector to which the full-wave rectified voltage Vo is applied from the rectifier 3, a choke coil 523 which connects an emitter of the transistor 521 and the common terminal of the selecting switch 60, a diode 522 with the anode grounded and the cathode connected to an input terminal of the choke coil 523 and a smoothing capacitor 524 connected between an output terminal of the choke coil 523 and ground. The diode 522, the choke coil 523 and the capacitor 524 compose a common voltage smoothing circuit.

Figure 4:
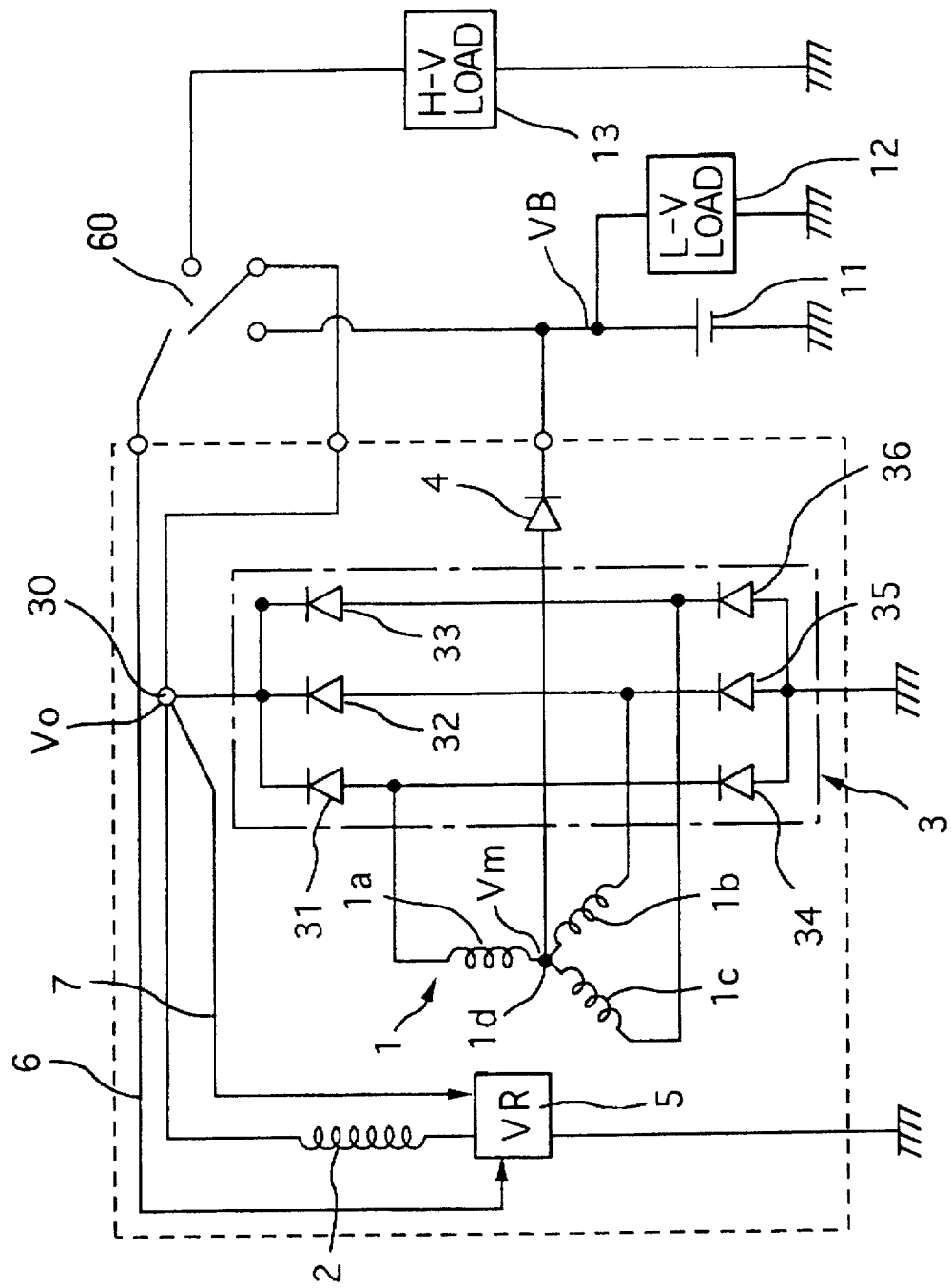
FIG. 4 is a circuit diagram showing a generating apparatus according to a second embodiment.

Operation (see FIG. 13) of the regulator circuit 51 is substantially the same as the operation (see FIG. 5) of the regulator 5 shown in FIG. 4 except that the transistor 521 of the chopper circuit 52 is on-off controlled. That is, the output voltage Vo of full-wave rectifier 3 is regulated by the chopper circuit 52 and the regulator circuit 51. In other words, the regulator circuit 51 detects the position of the switch 60 and the output voltage Vo of the output terminal, whereby when the output voltage Vo is higher than a fixed value (13.5 V or 24 V),the transistor is turned on, and when, on the other hand, the output voltage Vo is lower than that value, it is turned off so that the voltage to be applied to the low-voltage load 12 or the high-voltage load can be regulated.

Figure 13:
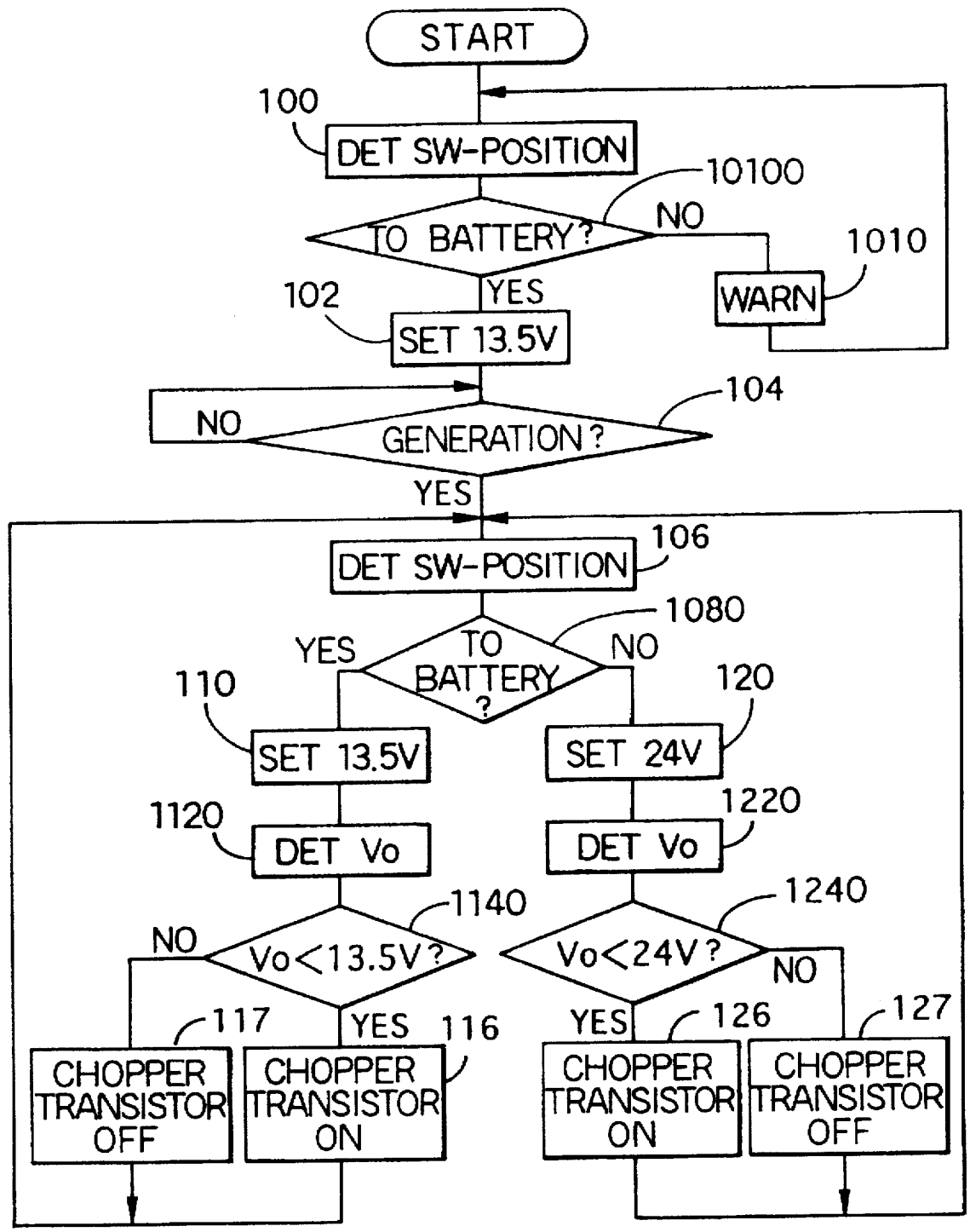
FIG. 13 is a flow chart showing operation of the generating apparatus according to the seventh embodiment.

An operation example of the regulator circuit 51 is described with reference to a flow chart shown in FIG. 13. Since steps 100–1140 and the steps 120–1240 of the flow chart for this embodiment is the same as those of the second embodiment shown in FIG. 5, only different steps are described hereafter.

When the switch 60 is connected to the battery, the transistor 521 is turned off if the output voltage Vo becomes higher than 13.5 V in a step 117, and the transistor 521 is turned on if lower than 13.5 V in a step 116. When the switch 60 is connected to the high-voltage load 13, the transistor 521 is turned off if the output voltage Vo becomes higher than the fixed voltage 24 V in a step 127, and the transistor 521 is turned on if not higher than 24 V in a step 126.

Thus, the permanent magnet type generator also can energize two voltage-level electric loads with desired voltages.

(Eighth Embodiment)

Figure 14:
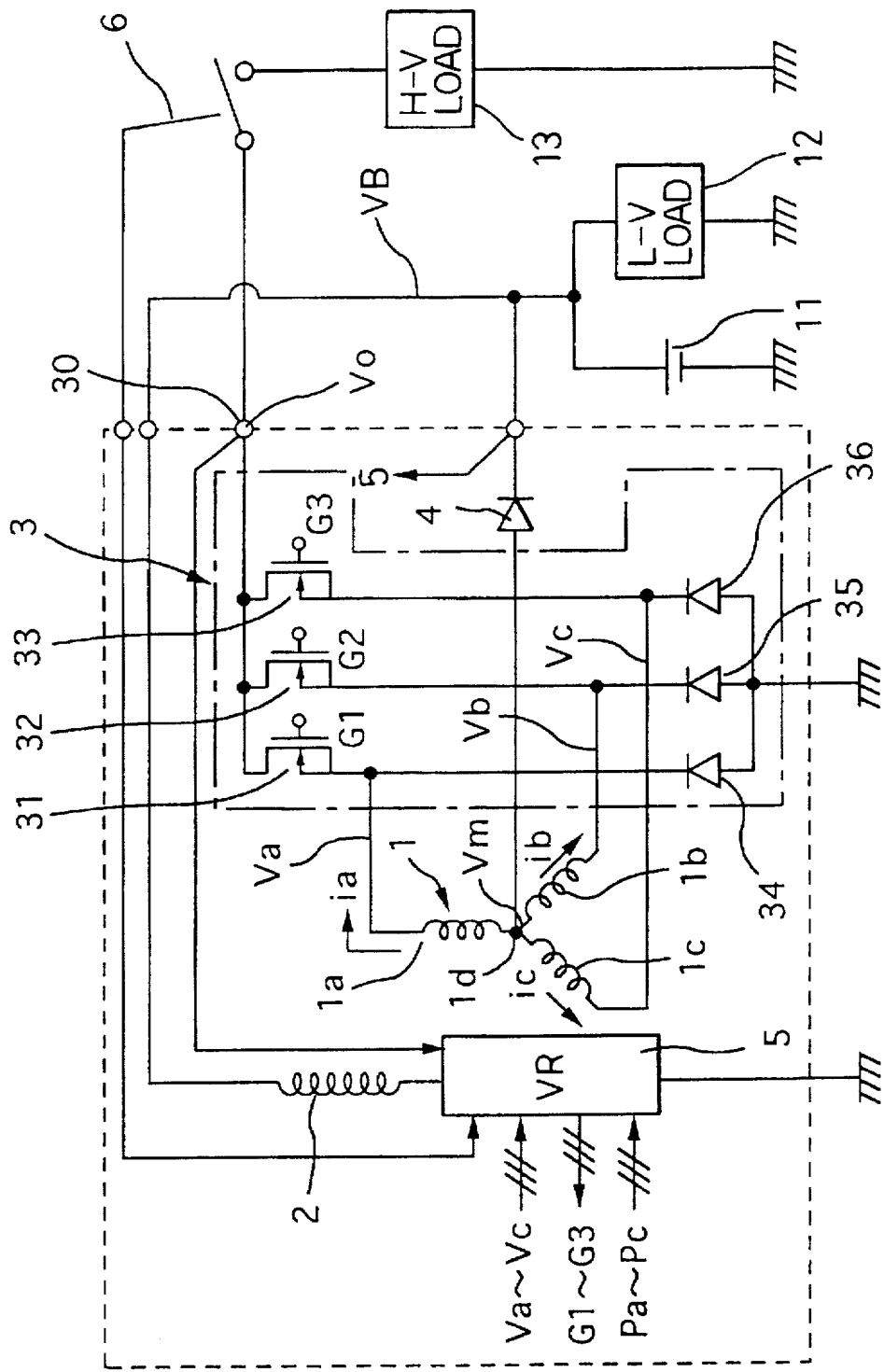
FIG. 14 is a circuit diagram showing a generating apparatus according to an eighth embodiment.

A vehicle generation apparatus according to an eighth embodiment is described with reference to a block diagram shown in FIG. 14.

This generation apparatus is composed of a three-phase synchronous generator 1, a three-phase full-wave rectifier 3, a diode 4 and a voltage regulator 5. The full-wave rectifier 3 includes a high-side half bridge composed of MOSFETs 31–33 and a low-side bridge composed of diodes 34–36. The voltage regulator includes a microcomputer which calculates and amplifies gate-driving signals applied to the MOSFETs 31–33. The MOSFETs are preferably made of Si or SiC in order to enhance heat and high voltage resistance.

Figure 15:
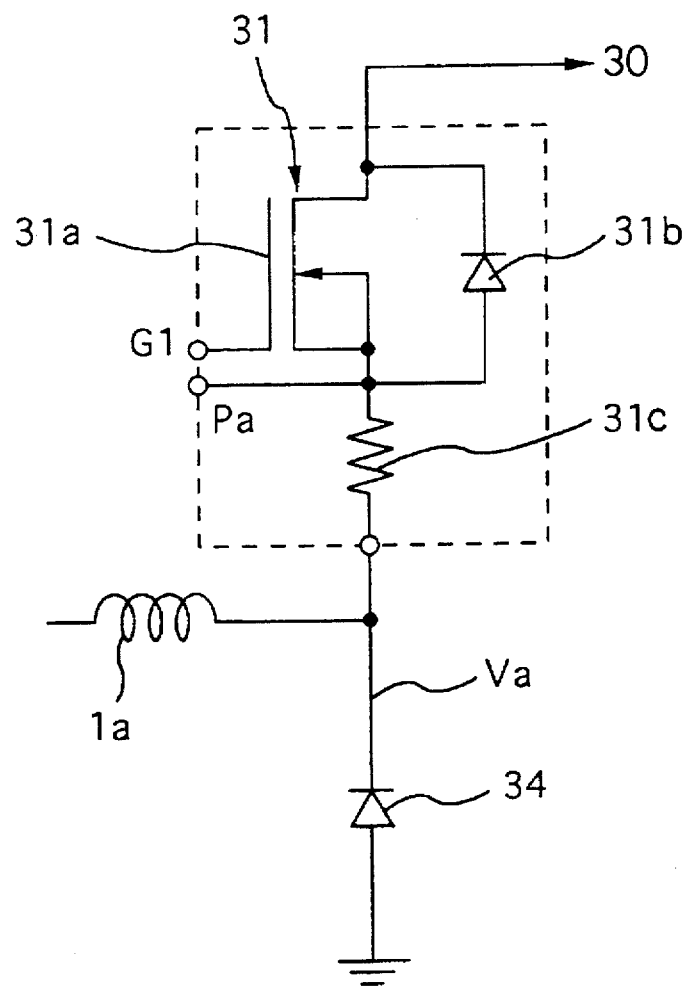
FIG. 15 is a circuit diagram showing an inverter circuit for one phase of a three-phase full-wave rectifier 3 of the apparatus according to the eighth embodiment.

The MOSFET 31 is a high-side switch and an N-channel type as shown in FIG. 15. The MOSFET 31 has an N-type area on the armature winding's side which is the drain area, an N-type area on the battery's side which is the source area and P-well region right under the gate member 31a, which is short-circuited to the N-type area on the armature winding's side to have a fixed voltage level. Accordingly, a PN junction between the P-well region and the N-type area on the battery's side forms a parasitic diode 31b. The N-type area on the armature winding's side is connected to an armature windings 1a through a low-resistance resistor 31c so that the voltages Pa and Va at both sides of the resistor 31c are applied to the voltage regulator 5. The resistor 31c is formed of low-resistance polycrystal-semiconductor-layer disposed on a semiconductor plate via an insulator film or patterned metal wire. Channel current can be detected by detecting the voltage drop of the resistor 31c.

The other MOSFETs 32 and 33 have the same structure, and respective voltages Pb and Vb, and Pc and Vc on both sides of the resistors 32c and 33c are applied to the controller 5. Parasitic diodes 32b and 33b are also formed as the parasitic diode 31b so that the parasitic diodes 31b, 32b and 33b provide current paths of the generator. In summary, respective differences (voltage drops) between the phase voltages Va–Vc and the voltages Pa–Pc indicate the passing current of the MOSFETs 31–33.

Gate voltages G1–G3 are high enough for the MOSFETs 31–33 to operate in the non-saturated operation region (that is, in the mode where the channel is not pinched off by the depletion layer).

The high-voltage load 13 is energized through the high-voltage load switch 6 by the high voltage DC terminal 30 of the three-phase full-wave rectifier 3, the low-voltage load 12 and the battery 11 are energized through the low voltage diode 4 by the neutral point 1d of the armature windings 1a, 1b and 1c. The low-voltage DC terminal of the three-phase full-wave rectifier is grounded.

The basic operation of the voltage regulator 5 is described as follows.

The voltage regulator 5 reads the battery voltage VB when the high-voltage load is not energized, and PWM-control the built-in field switching transistor (not shown) to regulate the field current so that the battery voltage VB at 13.5 V. In this embodiment, the average value of the output voltage Vo of the high-voltage terminal 30 of the three-phase full-wave rectifier 3 becomes 24 V.

The voltage regulator 5 reads the output voltage Vo of the high-voltage terminal to PWM-control the field-switching transistor (not shown) when the high-voltage load is energized so that the Vo becomes 24 V. At this time, even if the conducting ratio of the field-switching transistor becomes 100%, the turn-off time of the MOSFETs 31–33 is delayed and the leading currents are supplied to the armature windings 1a, 1b and 1c ahead of the phase voltages Va, Vb and Vc as long as Vo is lower than 24 V, thus increasing the generator output voltage.

Operation of this embodiment is described next.

Just after the engine is started to drive the generator, the switch 6 is turned on by an engine control unit ECU (not shown), and the built-in output-voltage-setting-register (not shown) is set to provide the first control voltage 13.5 V. A three-phase symmetrical AC voltage is generated in the armature windings 1a, 1b and 1c to have the vector center on the neutral point. The voltage regulator 5 compares the battery voltage VB with the first control voltage 13.5 V to supply the field current when the battery voltage VB is lower and to cut the field current when the battery voltage VB is higher.

The battery 11 is charged from the neutral point 1d. Accordingly, the battery 11 is charged when the voltage Vm of the neutral point 1d becomes higher than a voltage (about 14.3 V) which is given by adding the battery voltage VB and the forward voltage drop (0.8 V). When the battery voltage lowers, the field current is increased in the described manner to raise the voltage Vm of the neutral point 1d, thereby increasing the charging current of the battery 11. When the battery voltage increases excessively, the field current is reduced to lower the voltage Vm of the neutral point 1d, thereby reducing the charging current of the battery 11.

When the switch 6 is closed by the ECU and the voltage regulator 5 detects the closing of the switch 6, the built-in generation-voltage-setting register (not shown) of the voltage regulator 5 provides the second control voltage, that is 24 V. The voltage regulator 5 reads the full-wave rectified voltage Vo of the high-voltage terminal 30 of the three-phase full-wave rectifier 3 instead of the battery voltage VB, and compares it with the second control voltage 24 V, whereby when the full-wave rectified voltage Vo is lower, the field current is supplied and when the full-wave rectified voltage is higher, the field current is cut.

Even if the field current becomes a maximum or the conducting ratio of the field-switching transistor becomes 100%, the turn-off time of the MOSFETs 31–33 is delayed to increase the leading current as long as Vo <24 V. When the output voltage Vo is higher, the leading current is reduced. Thus, the average voltage of about 24V-rectified-voltage is applied to the high-voltage load 13. In this time, the voltage Vm of the neutral point 1d becomes about 14.3 V so that the generator 1 can energize the high-voltage load 13 and the battery 11 at the same time.

Further, assuming that the forward voltage drop of the diodes 34–36 is 0.8 V, and the voltage drop of the MOSFETs 31–33 is about 0.4 V, the three-phase full-wave rectifier 3 forms a circuit between a high-side MOSFET of a phase-winding which generates voltage higher than 24.4 V and any output voltage of the other two phase-windings and a low-side diode of a phase winding which is lower than −0.8 V and lower than any output voltage of the other two phase-windings. That is, the neutral voltage Vm of the neutral point 1d has frequencies of three times as many as the frequencies of the phase-windings and is a half as high as the voltage Vo of the high-voltage terminal 30. Thus, when the neutral point voltage Vm becomes higher than 12.8 V (which is by a diode voltage drop 0.8 V higher than the battery voltage VB ), the battery is charged and when the neutral point voltage Vm is lower, the battery charge is stopped.

If the battery voltage VB lowers, current supplied from the neutral point 1d to the battery 11 increases, and the output voltage Vo of the high-voltage terminal 30 lowers. Since the output voltage Vo is regulated to be constant while the high-voltage load is being energized by the field current or the leading current, decrease of the output voltage Vo is compensated by increase of the generator output voltage caused by increase of the field current or the leading current.

On the other hand, if the battery voltage VB increases, current supplied from the neutral point 1d to the battery 11 decreases, and the output voltage Vo of the high-voltage terminal 30 increases. Since the output voltage Vo is regulated to be constant while the high-voltage load is being energized by the field current or the leading current as described above, increase of the output voltage Vo is compensated by decrease of the generator output voltage caused by decrease of the field current or the leading current.

That is, if the generator output voltage is controlled so that the output voltage Vo becomes constant, the output current supplied to the low-voltage load and the battery can be controlled satisfactorily even if the output voltage fluctuates.

Figure 16:
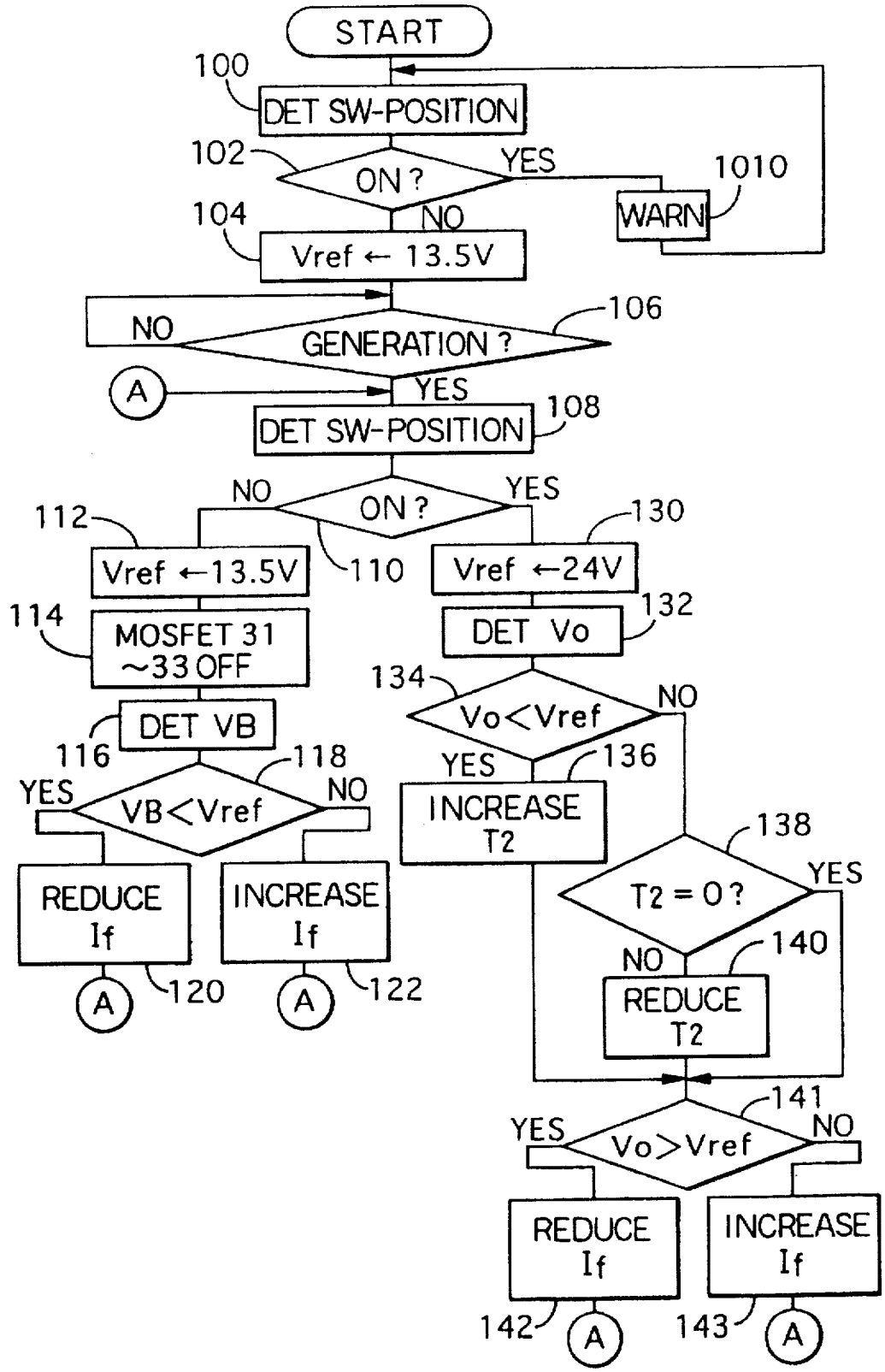
FIG. 16 is a flow chart showing operation of a voltage regulator 5 of the apparatus according to the eighth embodiment.

An operation example of the voltage regulator 5 is described with reference to FIG. 16.

At the beginning, the position of the switch 6 is detected in a step 100. If the switch is turned on, a warning is issued in a step 1010 and the process returns to the step 100. If the switch 6 is turned off, the built-in register is set to provide 13.5 V as a control voltage Vref in a step 104, and the process waits for engine-starting in a step 106. When the engine is started, the position of the switch 6 is detected again in a step 108 and whether or not the switch 6 is turned off is examined in a step 110. If the switch is turned off, the process goes to a step 112 to set Vref to 13.5 V and turn OFF all the MOSFETs 31–33 in a step 114, the battery voltage VB is detected in a step 116, and whether the battery voltage is lower than 13.5 V or not is examined in a step 118. If it is lower, the field current is increased by a set amount in a step 122, and if it is higher, the field current is reduced by a set amount in a step 120, and the process returns to the step 108.

On the other hand, if the switch 6 is turned on in the step 110, the register is set to provide 24 V as a control voltage in a step 130, the output voltage Vo is detected 132, and whether the output voltage is lower than 24 V or not is examined 134. If it is lower, after the MOSFETs 31–33 are turned on in the order described later, the turn-off timing of the MOSFETs 31–31 is delayed to increase the leading current by a set amount 136, the process jumps to a step 141. If it is higher than 24 V, whether or not the turn-off time $T_2$ of the MOSFETs 31–33 is 0 (non-leading mode) is examined in a step 138. If $T_2$ is 0, the process jumps to the step 141, and if $T_2$ is not 0, the process reduces $T_2$ by a set value in a step 140 and proceeds to the step 141.

In the step 141, whether the output voltage Vo is lower than 24 V or not is examined. If it is lower, the field current is increased, and if it is not, the field current is reduced, and the process proceeds to the step 108.

Figures 17C, 17D:
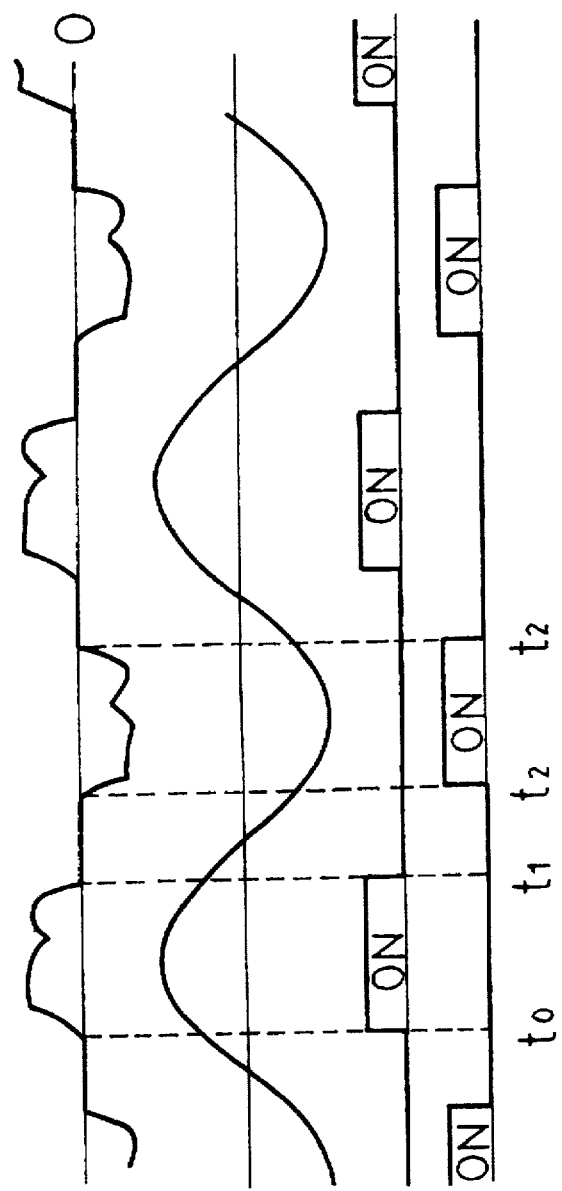
Figures 18A, 18B, 18C, 18D, 18E:
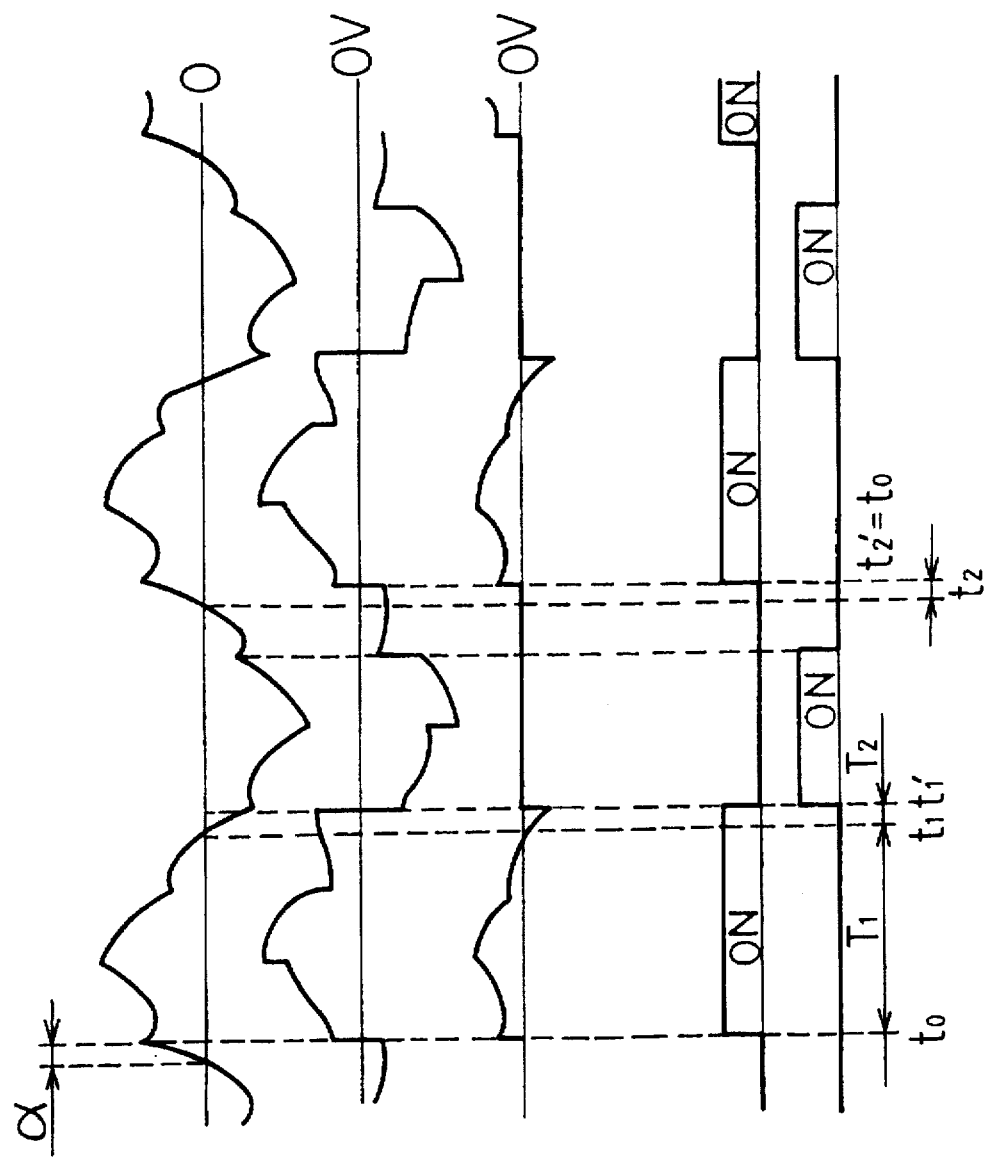
FIGS. 18A, 18B, 18C, 18D and 18E are timing charts showing operation of the apparatus according to the eighth embodiment when the leading current is supplied.
Figure 19:
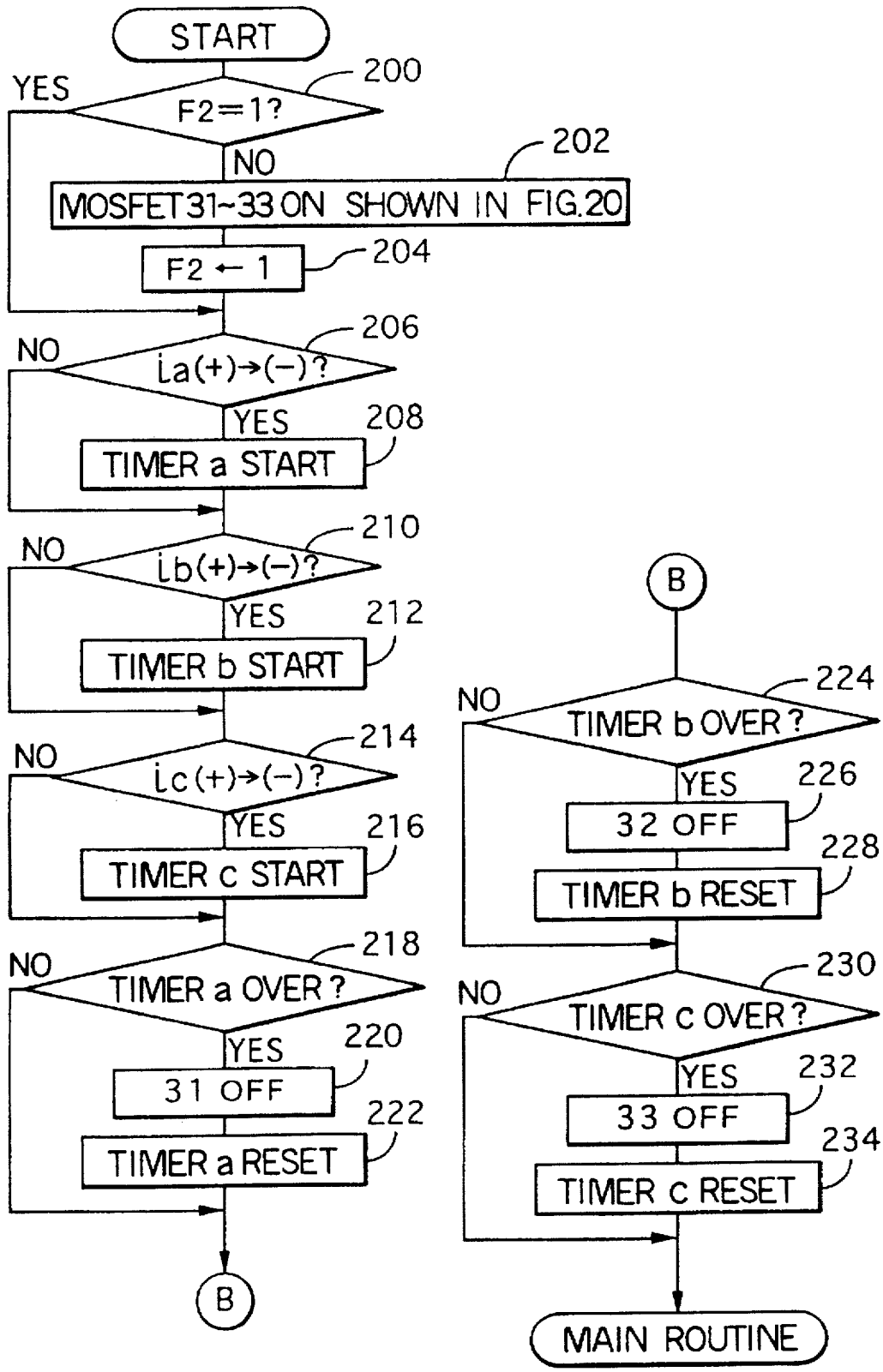
FIG. 19 is a flow chart showing operation of a voltage regulator 5 of the apparatus according to the eighth embodiment when the leading current is supplied.
Figure 20:
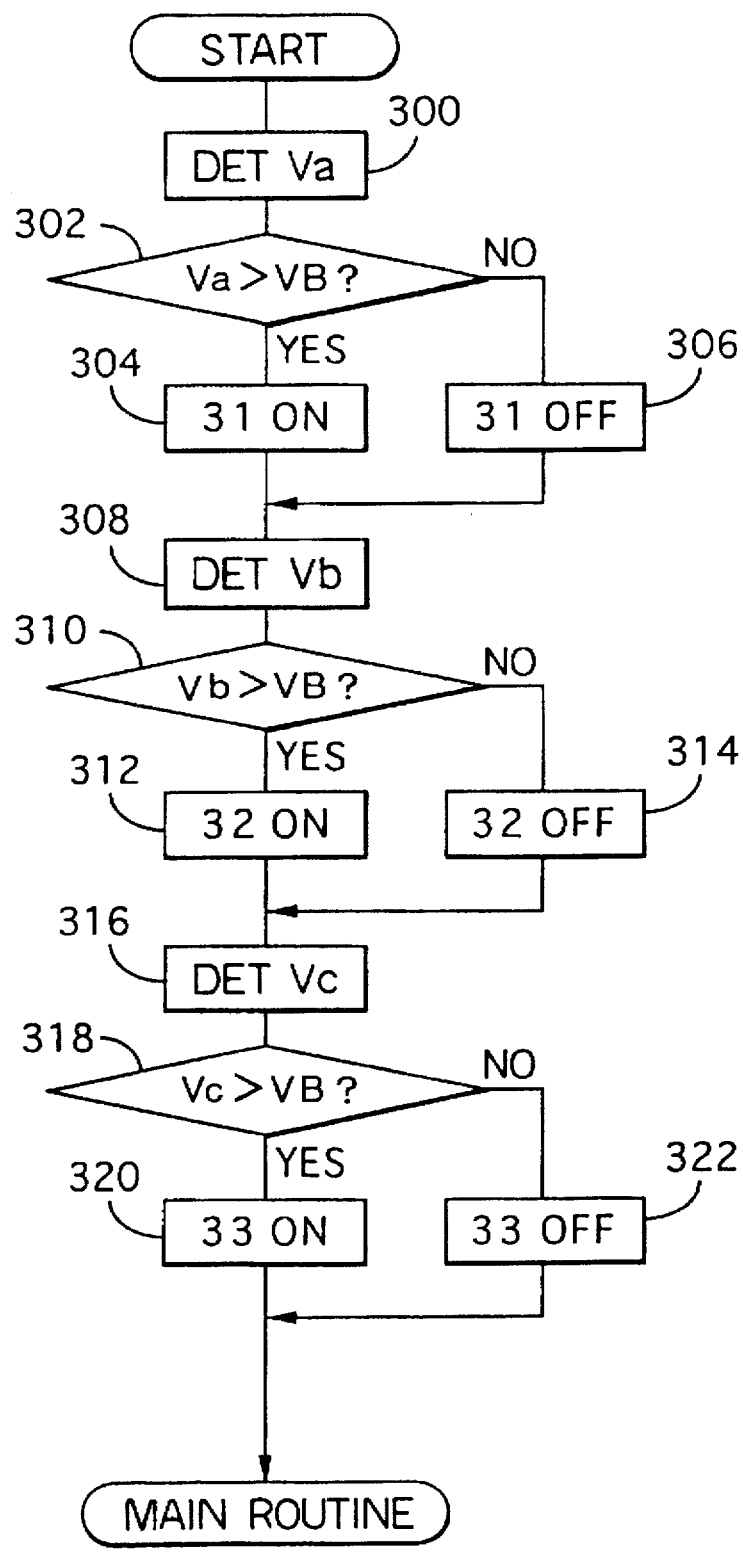
FIG. 20 is a flow chart showing operation of a voltage regulator 5 of the apparatus according to the eighth embodiment when the leading current is not supplied.

The generator-output-voltage-control by the leading current supply is described next with reference to FIGS. 17A–20. The leading current according to this embodiment is supplied only to the high-voltage load 13 (high-voltage generation mode). FIGS. 17A–17C are timing charts showing relationships between a-phase voltage Va, a-phase current Ia when the leading current is not supplied, and operation timing of the elements 31, 34. FIGS. 18A–18E are flow charts for on-off-controlling of the MOSFETs 31–33 when the leading current is supplied, and FIG. 20 is a flow chart for on-off-controlling of the MOSFETs 31–33 when the leading current is not supplied.

In this embodiment, the turn-off timing of the MOSFET 31 which is a high-side switch is set at a time t1' which is T2 behind the timing t1 at which the phase-current changes from the positive to the negative. The turn-off timing of the other MOSFETS 32 and 33, which are high-side switches, are set in the same manner as above. On the other hand, the turn-on timing of the MOSFETs 31–33 according to this embodiment is extended by about 180 phase-degrees behind the turn-off timing. Thus, the delayed turn-off timing causes the leading currents to be supplied from the battery 11 to the respective armature windings 1a, 1b and 1c, thereby increasing the effective magnetic field flux. That is, MOSFET 31 is not turned OFF at the timing t1 as shown in FIG. 18D and continues to supply the leading current to the armature winding 1a, but is turned off at time T2 behind the timing t1. As a result, the MOSFET 31 can draw the current out of the battery 11 to the armature winding 1a so that current can be supplied to the stator coil 1a at a time period α (see FIG. 18A) ahead to increase the magnetic flux. It is noted that the charging time $T_1$ and the OFF-delay time $T_2$ together are less than 180-degree-electric-angle. The same control is applied to the b-phase 120-degree-electric-angle (one third of one cycle) behind, and to the c-phase 120-degree-electric-angle ahead (two thirds of one cycle behind), so that three-phase leading-current-control can be carried out.

A subroutine of the leading-current-control mode is described with reference to a flow chart shown in FIG. 19. The subroutine is executed regularly, but independent of the main routine shown in FIG. 16.

At the beginning, whether the routine is executed for the first time or more than one time is examined by the flag F2 which is 1 or not 1 in a step 200. If more than one time (F2=1), the process jumps to a step 206. If, on the other hand, the process is executed for the first time (F2=0), the MOSFETs 31–33 are turned on by the use of non-leading-current-control routine in a step 202 shown in FIG. 20 to set the flag F2 to 1 in a step 204. Then, the process goes to a step 206. The flag F2 is reset to 0 when an electric source voltage is applied.

In the step 206, whether or not the current of the high-side switch 31 or the armature current ia changes from the positive (+) to the negative (−) while the high-side switch 31 is turned on, that is, whether or not the current changes the direction from the armature winding 1a to the high-voltage DC terminal to the direction from the high-voltage DC terminal to the armature winding 1a is examined. If the current changes, the built-in timer a is set to start in a step 208. On the other hand, if it does not change, the process goes to a step 210.

In the step 210, whether or not the current of the high-side switch 32 or the armature current ib changes from the positive (+) to the negative (−) while the high-side switch 32 is turned on, that is, whether or not the current changes the direction from the armature winding 1b to the high-voltage DC terminal to the direction from the high-voltage DC terminal to the armature winding 1b is examined. If the current changes, the built-in timer b is set to start in a step 212. On the other hand, if it does not change, the process goes to a step 214.

In the step 214, whether or not the current of the high-side switch 33 or the armature current ic changes from the positive (+) to the negative (−) while the high-side switch 33 is turned on, that is, whether or not the current changes the direction from the armature winding 1c to the high-voltage DC terminal to the direction from the high-voltage DC terminal to the armature winding 1c is examined. If the current changes, the built-in timer c is set to start in a step 216. On the other hand, if it does not change, the process goes to a step 218.

In the step 218, whether the timer a is over or not is examined, that is, whether a set delay time (leading current supply time) $\Delta T = T_2$ is over or not. If it is not over, the process goes to a step 224 directly. On the other hand, if it is over, the high-side switch 31 is turned off and the timer a is set to 0 (reset), and the process goes to the step 224.

In the step 224, whether the timer b is over or not is examined, that is, whether a set delay time $\Delta T = T_2$ is over or not. If it is not over, the process goes to a step 230 directly. On the other hand, if it is over, the high-side switch 32 is turned off and the timer b is set to 0 (reset), and the process goes to the step 230.

In the step 230, whether the timer c is over or not is examined, that is, whether a set delay time $\Delta T = T_2$ is over or not. If it is not over, the process returns to the main routine directly. On the other hand, if it is over, the high-side switch 33 is turned off and the timer c is set to 0 (reset), and the process goes to the main routine. The armature current ia can be detected from the voltage drop of the low resistance resistor 31c, and other currents ib and ic can be detected in the same way.

Thus, the delay of the turn-off time causes the respective armature windings 1a, 1b and 1c to be supplied with the leading current, so that magnetic field flux effective to the generation can be increased. That is, the MOSFET 31 is not turned OFF at the timing t1 but is turned OFF a period $\Delta T = T_2$ behind. Thus, current can be driven out of the battery 11 to the armature windings 1a, 1b and 1c so that current can be supplied to the stator coil 1a at a time α (see FIG. 18 A) ahead to increase the magnetic flux. It is noted that the charging time $T_1$ and the OFF-delay time $\Delta T = T_2$ together are less than 180-degree-electric-angle. The same control is applied to the b-phase 120-degree-electric-angle behind, and to the c-phase 120-degree-electric-angle ahead, so that three-phase leading-current-control can be carried out.

In the above embodiment, the MOSFETs 31-33 are respectively turned on for a 180 degree period. However, such on-period can be shortened. In this case, off-time period of both high-side switch and low-side switch of the inverter circuit for each phase overlap with each other. Therefore, the control is carried out as follows.

That is, while the high-side switch 31 and the low-side switch 34 are turned off and if the phase-voltage Va of the armature winding 1a becomes higher than the output voltage Vo of the high-voltage terminal of the three-phase full-wave rectifier 3, the high-side switch 31 is turned on. On the other hand, the high-side switch which has been turned on can be turned off a set delay time Δ T after the phase-voltage Va becomes lower than the output voltage Vo. The same control can be applied to the b and c phase. The above on-off-control may be applied only to the a-phase while the other b-phase and c-phases may be controlled by shifting the switching timing by 120 degrees in sequence.

According to this embodiment, since electric power can be supplied to the high-voltage load, the battery and the low-voltage load at the same time, and also the output voltages for the high-voltage side and the low-voltage side can be controlled separately, the high-voltage load 13 can be energized at an optimum voltage without regard to the battery voltage even if the battery voltage becomes low.

When the high-voltage is not energized, the MOSFETs 31–33 are turned off. Although the parasitic diodes 312a, 322b and 332c of the MOSFETs and the low-side half bridge diodes 34–36 form a full-wave rectifier, current does not flow since the switch 6 is turned on.

In the above embodiment, the MOSFETs 31–33 are used for the high-side switches of the three-phase full-wave rectifier 3. However, they can be used as low-side switches or both low and high-side switches. The diode 4 which is the low-side rectifier can be replaced with a transistor. For example, a bi-polar transistor is used to operate in the non-saturated region and the base current is supplied so that the emitter and collector voltages become equal. As a result, the voltage drop of the diode can be eliminated, thereby to reduce electric power loss. If the diode is replaced by a switching element and a control means, more precise power control can be provided without regard to the battery condition.

The MOSFETs of this embodiment have current-detecting function, however, a magnetic-pole-position sensor such as an encoder can be used to on-off-control the MOSFETs for more precise operation.

(Ninth Embodiment)

A ninth embodiment is described with reference to FIG. 21. This Embodiment uses a changeover switch 60 which connects the high-voltage DC output terminal 30 to either high-voltage load 13 or battery 11 instead of the switch 6 shown in FIG. 14. Operation shown in a flow chart in FIG. 22 is substantially the same as the operation of the eighth embodiment shown in FIG. 16 except for a step 1020 in which whether the changeover switch 60 is connected to the high-voltage load 13 is examined instead of the step 102 in which whether the switch is turned on or not is examined and also for a step 1100 in which whether the changeover switch 60 is connected to the high-voltage load 13 is examined instead of the step 110 in which whether the switch 6 is turned on or not is examined. Since all the steps are to examine whether the high-voltage load 13 is energized or not, the function of both embodiments are is the same.

(Tenth Embodiment)

A tenth embodiment is described with reference to FIG. 23.

Figure 22:
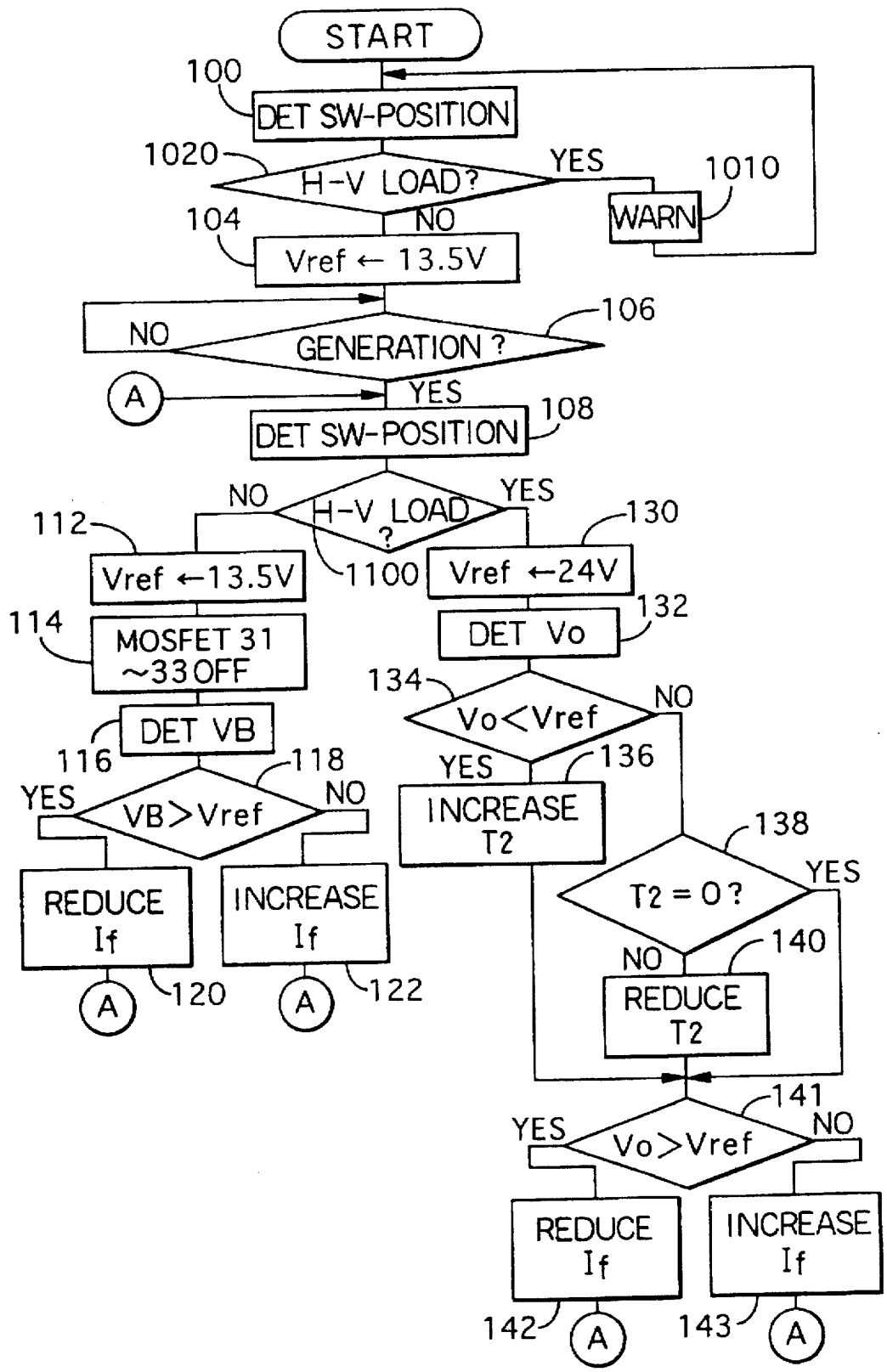
FIG. 22 is a flow chart showing operation of a voltage regulator 5 of the apparatus according to the ninth embodiment.
Figure 23:
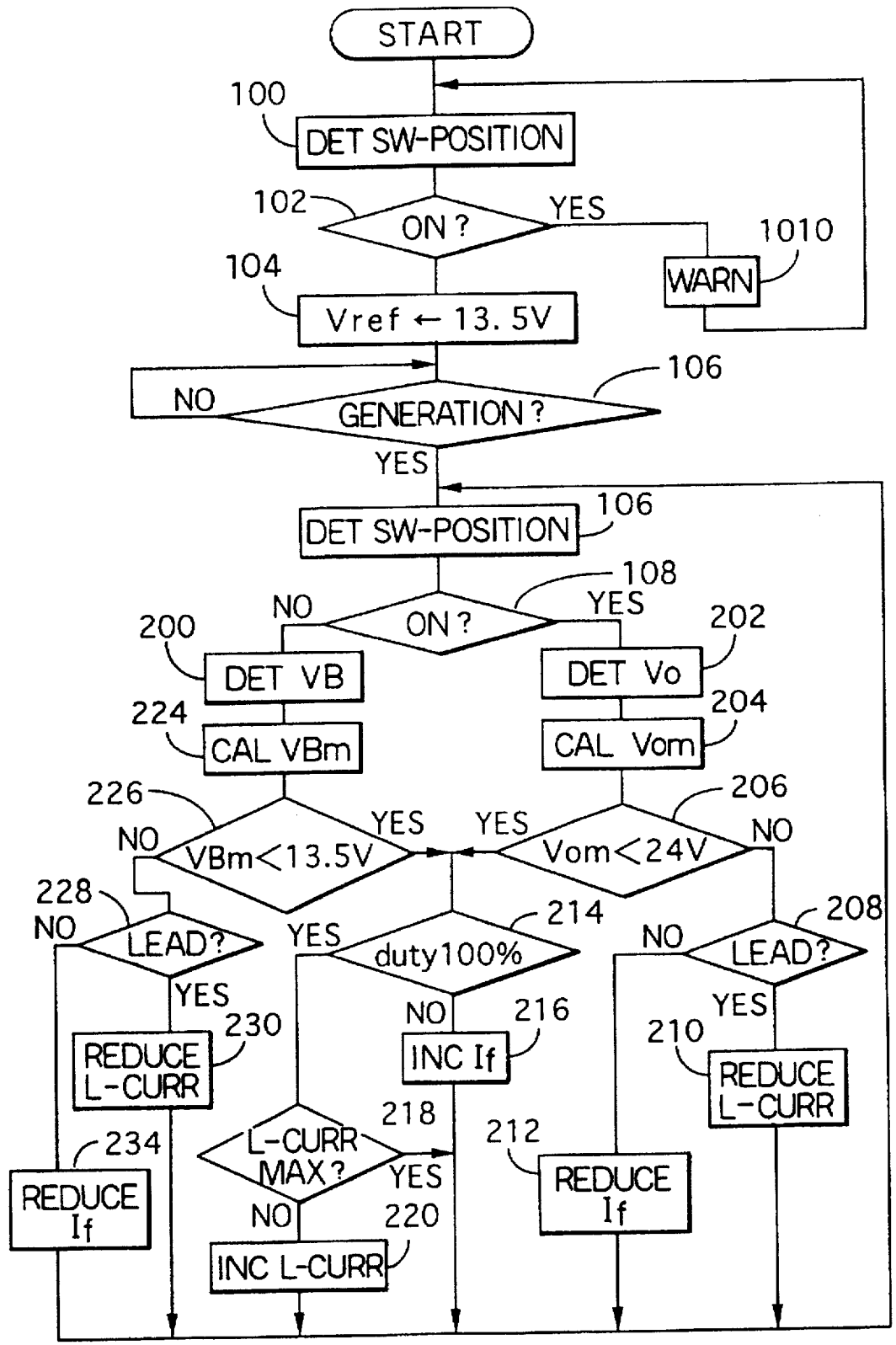
FIG. 23 is a flow chart showing operation of a voltage regulator 5 of a generating apparatus according to a tenth embodiment.

A flow chart shown in FIG. 23 is substantially the same as FIG. 16 or FIG. 22 except for the steps after the step 108 which are changed as follows.

At the beginning, in the step 108 if turn-on of the switch 6 or connection of the changeover switch 60 and the high-voltage load 13 is detected, that is, the high-voltage load 13 is energized, the output voltage Vo is read in a step 202 to calculate an average voltage Vom in a step 204, and whether the average voltage Vom is smaller than 24 V or not is examined in a step 206. If it is not lower, whether the leading current is being supplied or not is examined in a step 208, and if being supplied, the leading current is reduced by a set amount 210, and the process returns to the step 106.

In the step 208, if the leading current is not supplied, the field current If is reduced by a set amount in a step 212, and the process returns to the step 106. In the step 206, if the average voltage Vom is lower than 24 V, whether the PWM-on-duty ratio of a switching transistor for controlling the field current If is 100% or not is examined in a step 214.

If it is not 100%, the field current If is increased by a set value in a step 216, and the process returns to the step 106. If the PWM-on-duty ratio of the switching transistor for controlling the field current If is 100%, whether the supply of the leading current is maximum (set maximum output voltage of the generator in a corresponding speed range) or not is examined in a step 218. If it is maximum, the process goes to the step 106 directly. On the other hand, if it is not, the leading current is increased by a set amount in a step 220 and the process goes to the step 106.

When the switch 6 is turned off or the changeover switch 60 is connected to the low-side voltage load 12 in the step 108, that is, when the high-voltage load 13 is not energized, the battery voltage VB is read in a step 200, the average voltage VBm is calculated in a step 224 to examine whether the average voltage VBm is lower than 13.5 V or not in a step 226. If it is not lower, whether the leading current is being supplied or not is examined in a step 228. If being supplied, a set amount of the leading current is reduced in a step 230, and the process returns to the step 106. If the leading current is not supplied in the step 228, the field current is reduced by a set amount in a step 234, and the process returns to the step 106. If the average voltage Vo is lower than 24 V, the process proceeds to a step 214. It is noted that the leading current changes as the delay time $T_2$ changes.

The above control has the following effects.

That is, if the generator output power is not sufficient, the field current If is increased. However, if the generator output power is still insufficient, the leading current is supplied. If the generator output power is excessive, the leading current is first reduced and the field current If is reduced thereafter if the generator output power is still excessive. Thus, voltage fluctuation due to increase of ripple caused by the leading current supply can be reduced and decrease of the generator's size and weight and increase of generator output power can be realized.

When the high-voltage load 13 is energized, the output voltage Vo of the high-voltage load is regulated to the control voltage 24 V firstly. However, the output voltage Vo decreases as the battery charging current through the diode 4 increases, and the output voltage Vo increases as the battery charging current through the diode 4 increases as described above, so that the battery voltage VB can be maintained in a suitable range.

(Eleventh Embodiment)

An eleventh embodiment is described with reference to FIG. 24.

Figure 24:
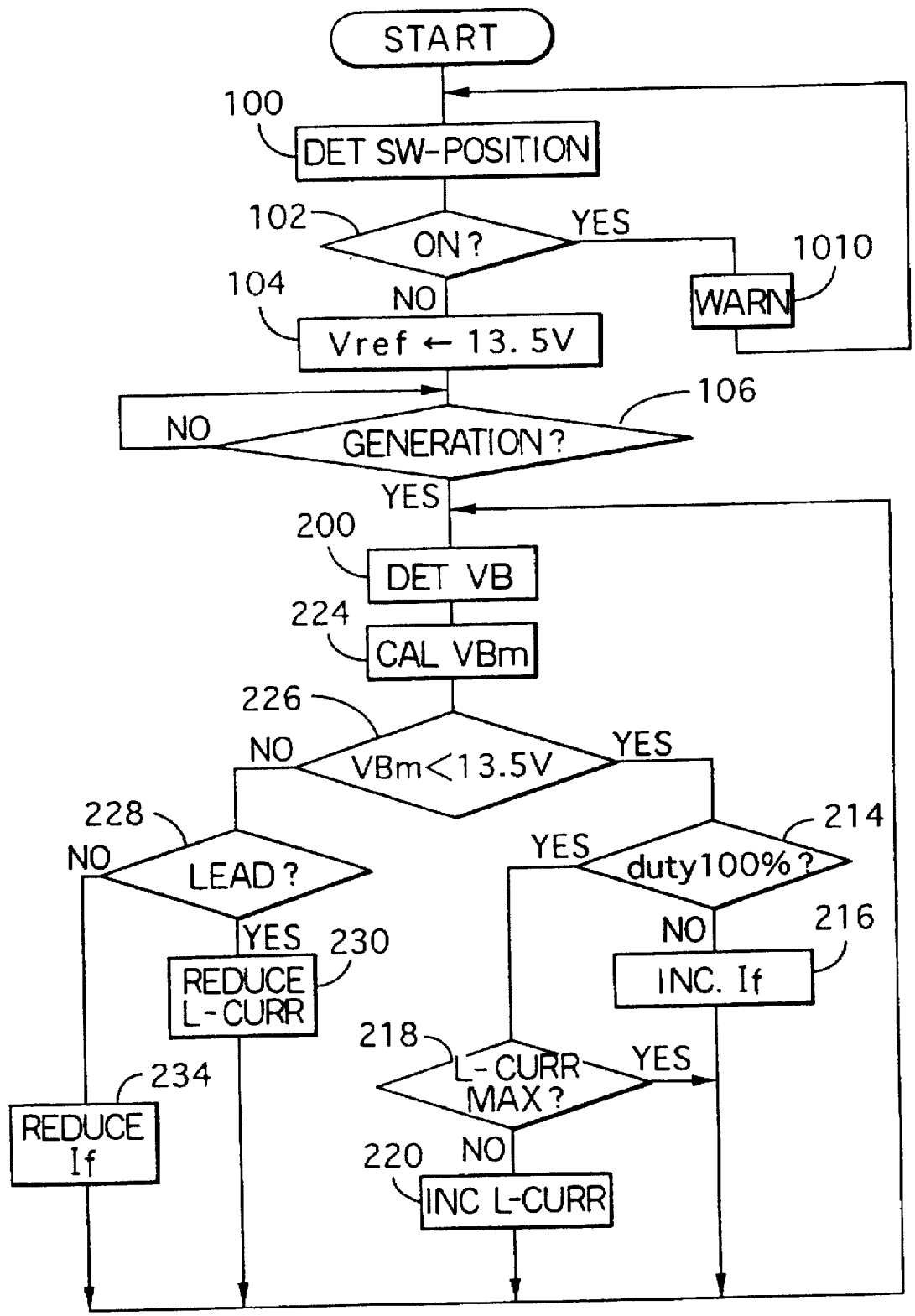
FIG. 24 is a flow chart showing operation of a voltage regulator 5 of a generating apparatus according to an eleventh embodiment.

A flow chart shown in FIG. 24 is equal to the flow chart shown in FIG. 23 without the steps 106, 108, and 202-212.

That is, the average voltage VBm of the battery 11 is regulated to 13.5 V whether or not the high-voltage load 13 is energized according to this embodiment.

Although a moderate voltage fluctuation for the high-voltage load 13 is permissible, the fluctuation of the battery voltage affects various electronic devices. According to this embodiment, the fluctuation of the battery voltage can be controlled by a high priority. When current supply to the high-voltage load 13 increases, the neutral point voltage Vm lowers and charging current to the battery 11 reduces. Accordingly, the battery voltage VB lowers and the generator is controlled to increase the output voltage. Otherwise, the generator is controlled to lower the output voltage, so that the output voltage Vo is regulated within a suitable range indirectly.

(Twelfth Embodiment)

A twelfth embodiment is described with reference to FIG. 25.

Figure 25:
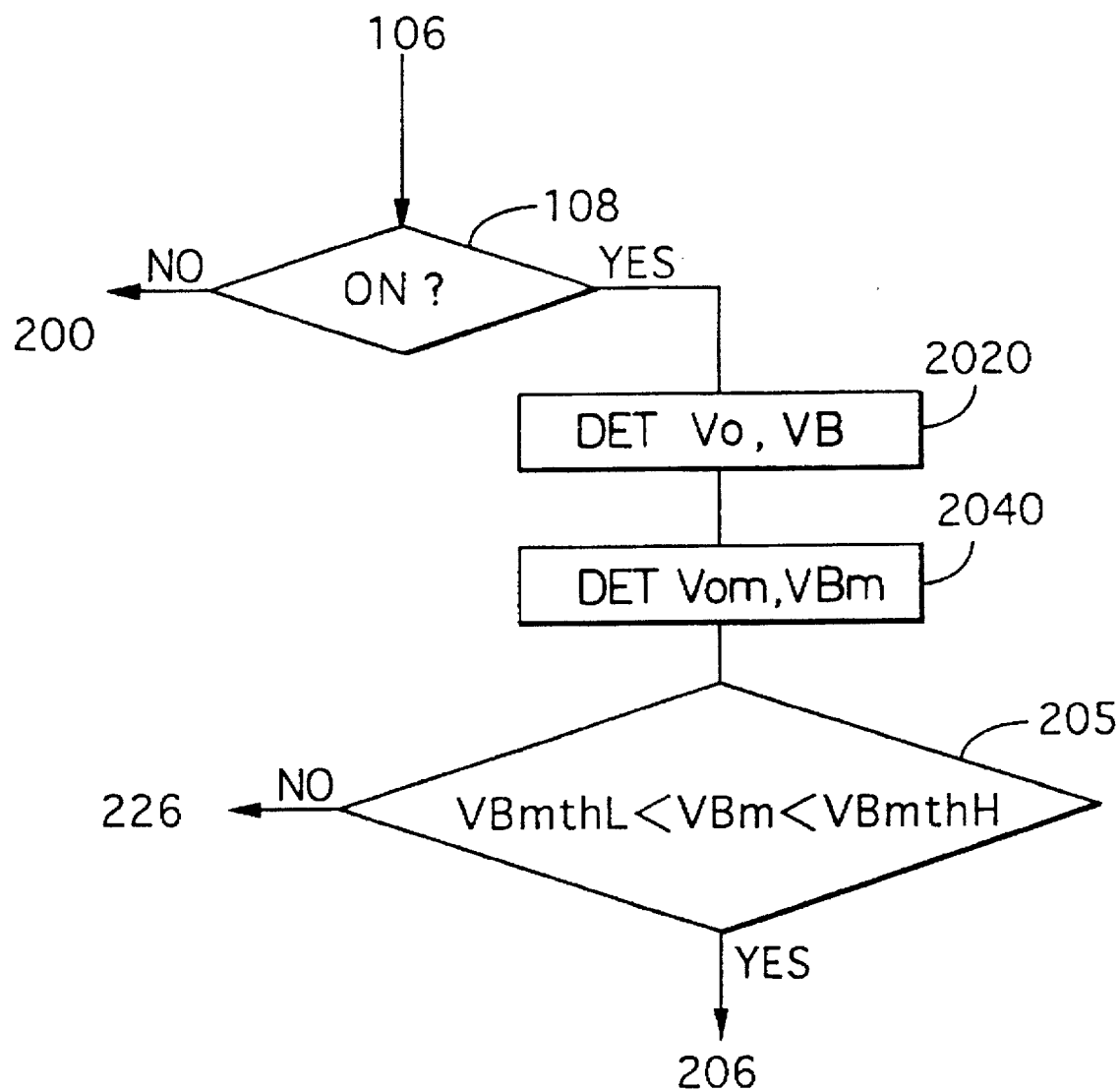
FIG. 25 is a flow chart showing operation of a voltage regulator 5 of a generating apparatus according to a twelfth embodiment.

As shown in FIG. 25, this embodiment has a step 2020 in place of the step 202, a step 2040 in place of the step 204 of the flow chart shown in FIG. 23, and an additional step 205 between the steps 204 and 205.

That is, the output voltage Vo and the battery voltage VB are read in the step 2020, and their average voltages Vom and VBm are calculated in the step 2040. In the step 205, whether the average voltage VBm of the battery voltage VB is in a range between a minimum threshold value VBthL and a maximum threshold value VBthH or not is examined. If it is out of the range, the process jumps to a step 226 to restore the battery voltage VB into this range immediately.

Thus, according to the embodiment shown in FIG. 23, the battery voltage VB is prevented from going out of the suitable range to cause excessive charging or discharging for some reason.

In the above embodiment, the MOSFETs are used for a two-way semiconductor rectifier in this embodiment. However, the bipolar transistors (such as IGBT) can be used therefor if they are parallelly connected in a manner that each pole of one bipolar transistor connected the opposite-polarity pole of the other.

(Thirteenth Embodiment)

Figure 26:
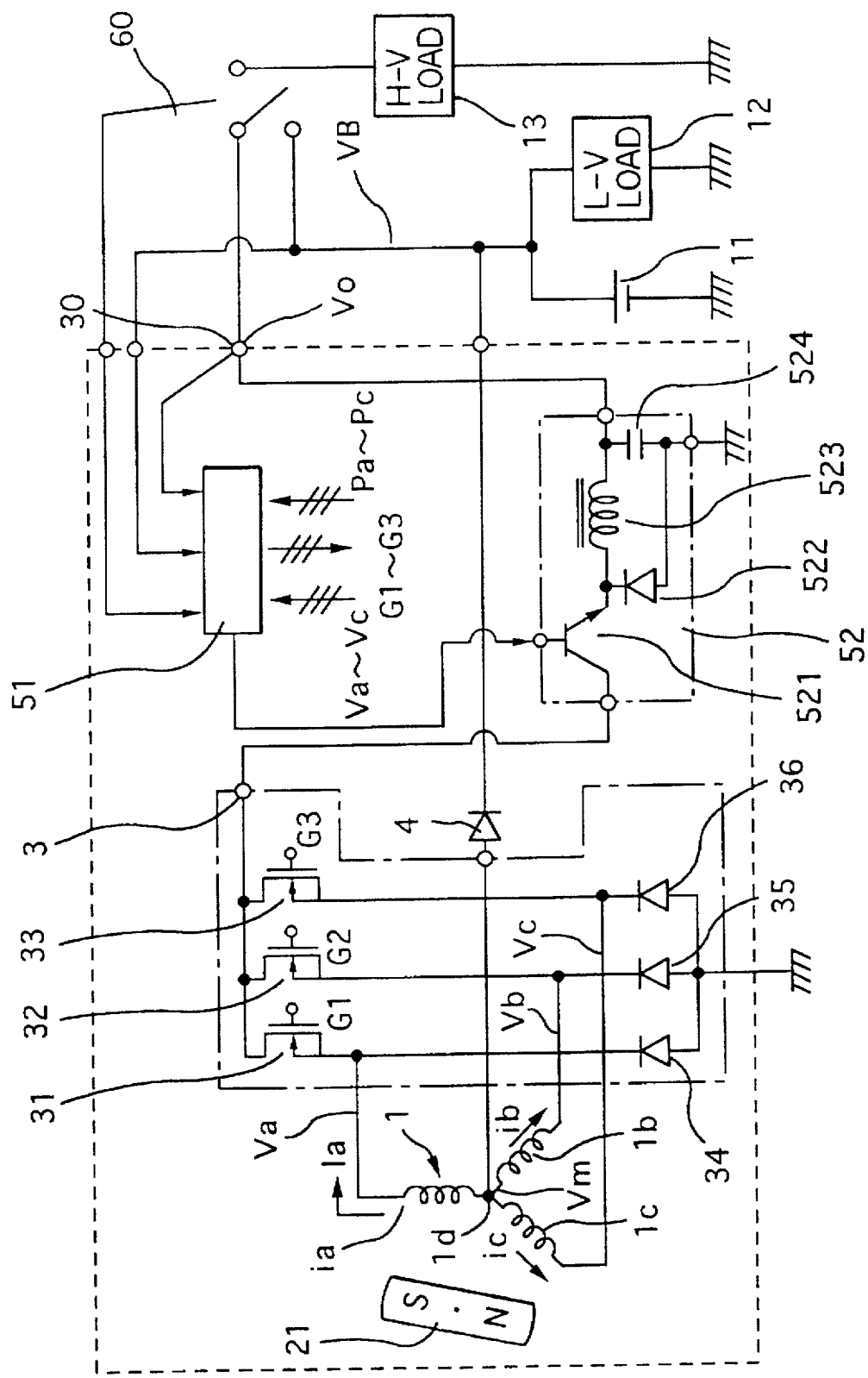
FIG. 26 is a circuit diagram showing a generating apparatus according to a thirteenth embodiment.

A thirteenth embodiment is described with reference to FIG. 26. This embodiment uses magnetic rotor 21 instead of the rotor having the field coil 2 of the generator 1, and uses a chopper circuit (on-off control means) 52 and a regulating circuit 51 in place of the regulator 5.

The chopper circuit 52 is composed of an npn transistor 521 having the collector to which the full-wave rectified voltage Vo of the rectifier 3 is applied, a choke coil 523 connecting the emitter thereof and the common terminal of the changeover switch 60, a diode 522 having the grounded anode and the cathode connected to the input terminal of the choke coil 523 and a smoothing capacitor 524 connected between the output terminal of the choke coil 523 and a ground. The diode 522, the choke coil 523 and the capacitor 524 are well-known voltage smoothing means.

Figure 21:
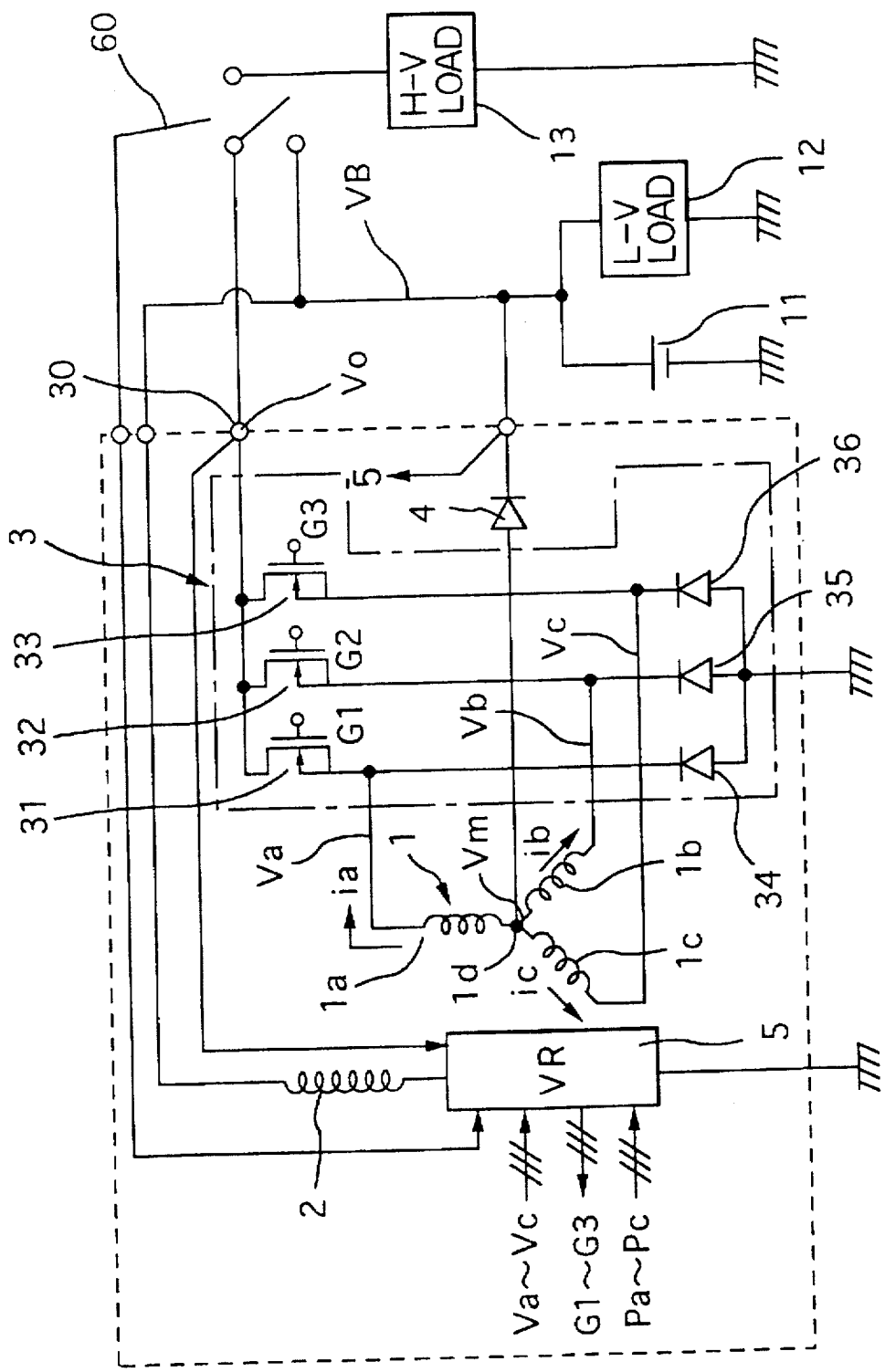
FIG. 21 is a circuit diagram showing a generating apparatus according to a ninth embodiment.

Operation of the regulator circuit 51 (see FIG. 27) is basically the same as the operation of the regulator 5 shown in FIG. 21 (see FIG. 22) except for the on-off controlling of the transistor 521 of the chopper circuit 52. That is, the high-voltage on the output terminal of the changeover switch 60 is regulated by the chopper circuit 52 and the regulating circuit 51. In other words, the regulating circuit 51 detects position of the switch 60 and the output voltage Vo of the output terminal and turns off the transistor 521 if the output voltage Vo is higher than a set value (13.5 V or 24 V) or turns off if the output voltage Vo is lower than the set value so as to control the voltage applied to the low-voltage load 12 or the high-voltage load 13.

Figure 27:
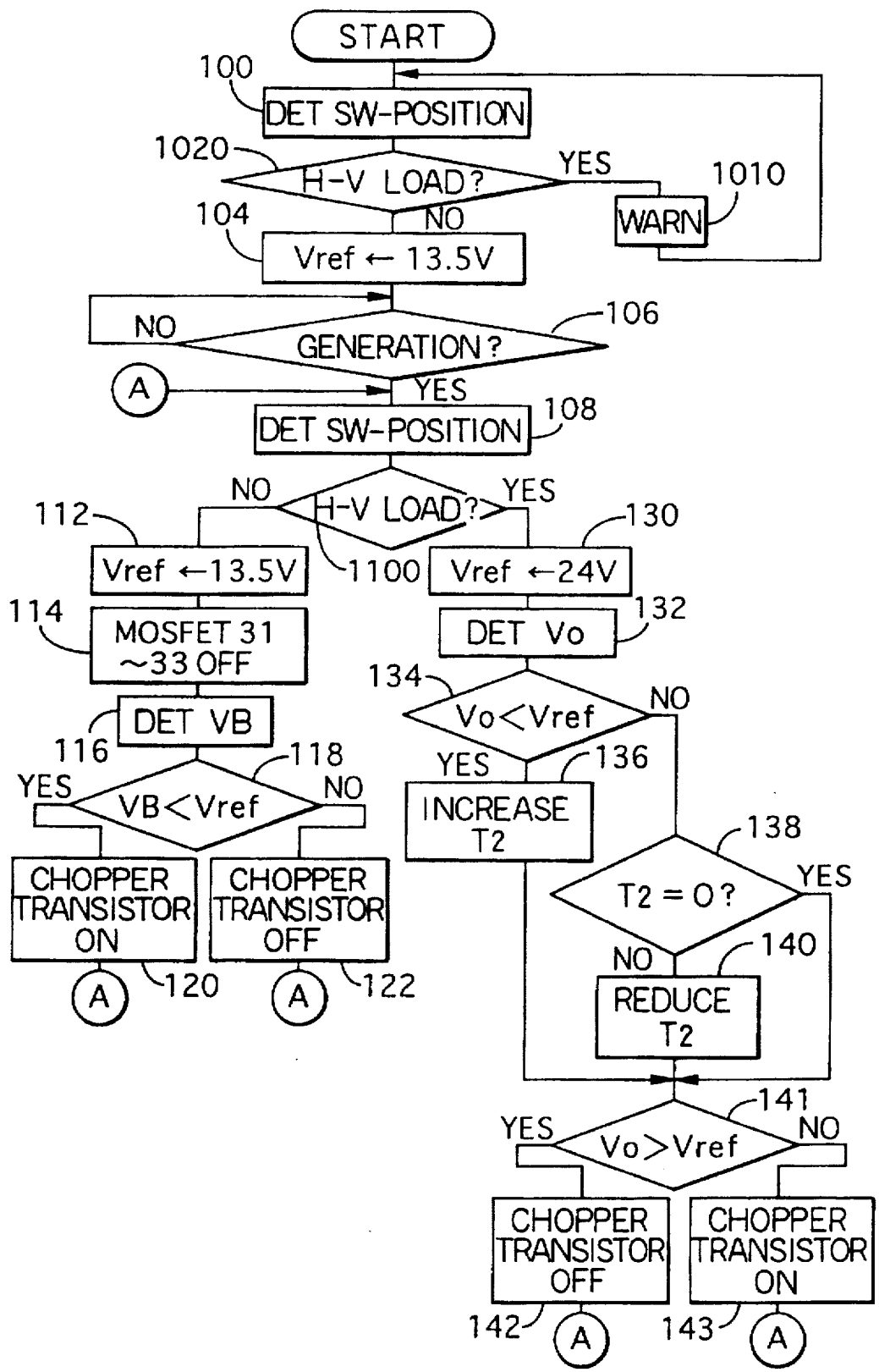
FIG. 27 is a flow chart showing operation of a voltage regulator 5 of the generating apparatus according to the thirteenth embodiment.

Operation of the regulating circuit 51 is described with reference to a flow chart shown in FIG. 27. The flow chart is almost the same as the flow chart shown in FIG. 22, and, therefore, only different steps are described.

When the switch 60 is connected to the battery, the transistor 521 is turned off if the output voltage Vo is higher than the set value 13.5 V in a step 122, or it is turned on if the output voltage is not higher than 13.5 V in a step 120. When the switch 60 is connected to the high-voltage load, the transistor 521 is turned off if the output voltage Vo is higher than the set value 24 V 142, or it is turned on if the output voltage Vo is not higher than 24 V in a step 143.

Thus, the permanent magnet type generator also can energize two voltage-level loads alternately and supply desired voltage levels by changing from one to the other of the control modes of the leading current and the field current.

(Fourteenth Embodiment)

Figure 28:
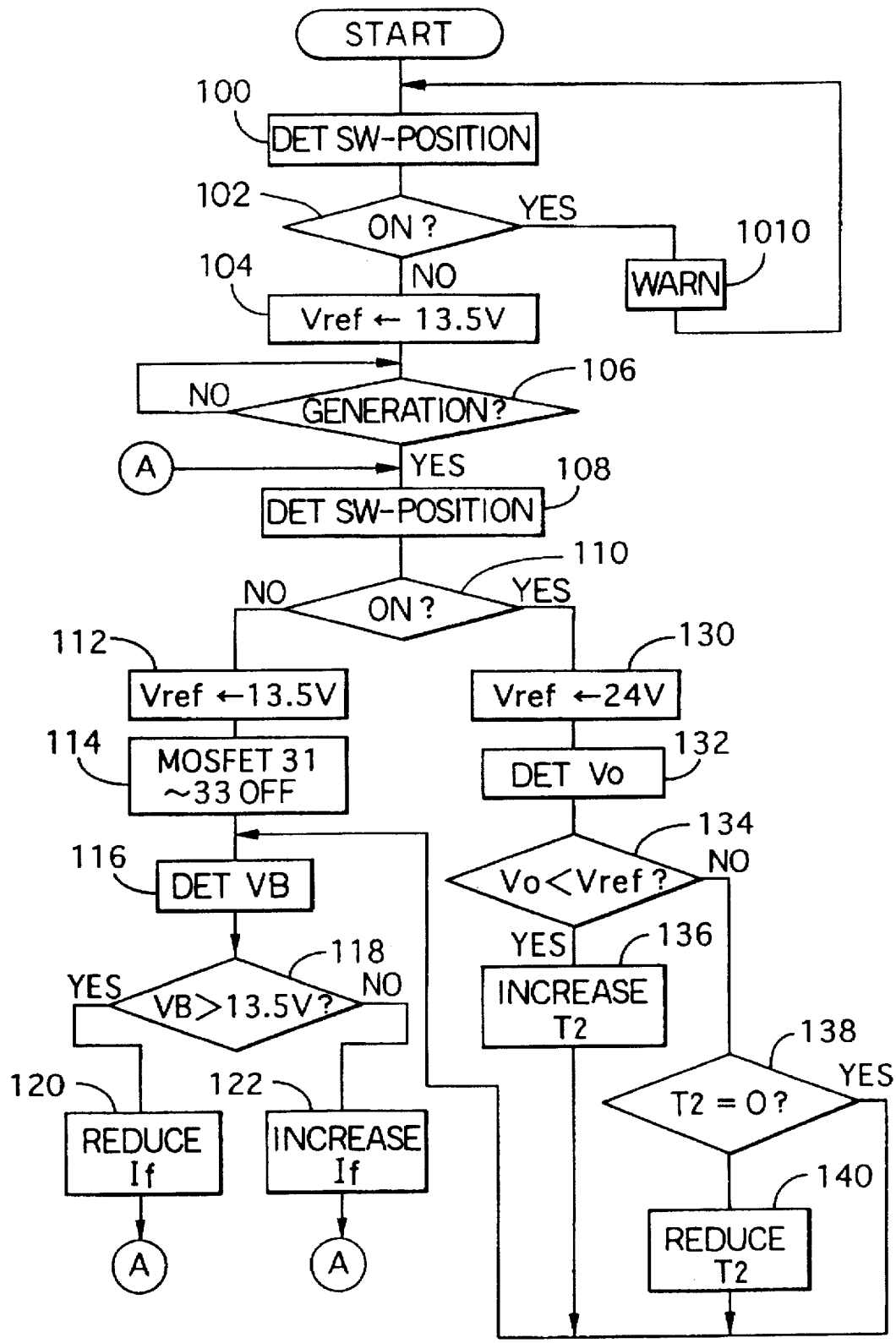
FIG. 28 is a flow chart showing operation of a voltage regulator 5 of a generating apparatus according to a fourteenth embodiment.

A fourteenth embodiment 14 is described with reference to FIG. 28. The process of this embodiment omits the steps 141–143 shown in FIG. 16, and jumps from the steps 136 and 140 to the step 116, in which Vref is fixed to 13.5 V.

Therefore, full-wave rectified voltage Vo, which is applied to the high-voltage load 13 when the high-voltage load 13 is energized, is regulated by the leading current control (the steps 132–140). At the same time, the low-voltage, which is applied to the low-voltage load 12 and the battery 11, is controlled by the field current control (steps 116–122).

(Fifteenth Embodiment)

Figure 29:
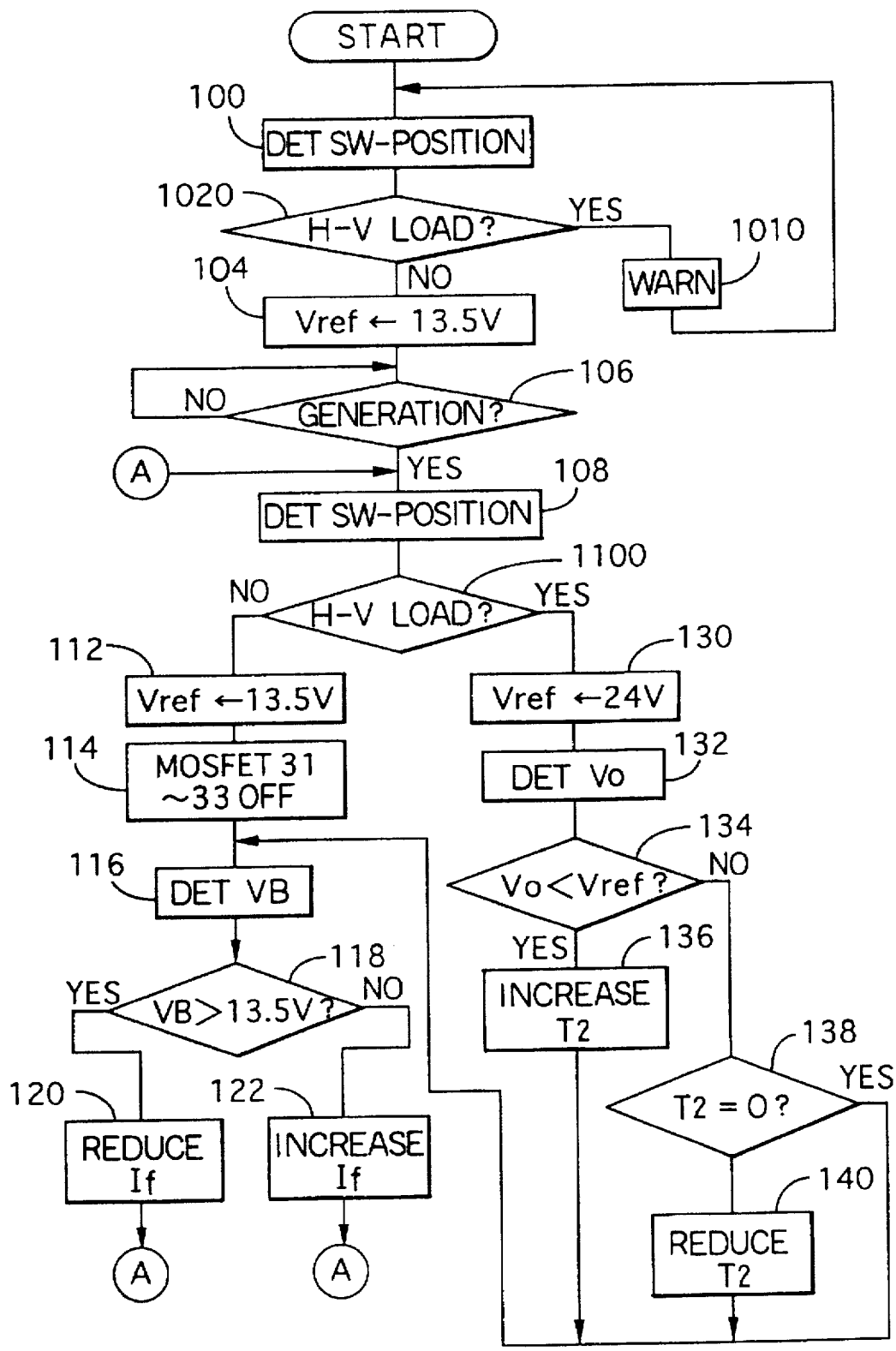
FIG. 29 is a flow chart showing operation of a voltage regulator 5 of a generating apparatus according to a fifteenth embodiment.

A fifteenth embodiment is described with reference to FIG. 29. The process of this embodiment omits the steps 141–143 shown in FIG. 22, and jumps from the steps 136 and 140 to the step 116, in which Vref is fixed to 13.5 V.

Therefore as in the fourteenth embodiment, the full-wave rectified voltage Vo, which is applied to the high-voltage load 13 when the high-voltage load is energized, is regulated by the leading current control (in the steps 132–140). At the same time, the low-voltage, which is applied to the low-voltage load 12 and the battery 11, is controlled by the field current control (in the steps 116–122).

That is, the generator output voltage is regulated by change of the field current to have a desired voltage when the high-voltage load is not energized. On the other hand, when the high-voltage load is energized, the output voltage Vo applied to the high-voltage load is regulated by the leading current control firstly and the battery voltage VB is regulated by the field current control thereafter, so that both voltages Vo and VB can be regulated within suitable ranges.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A generating apparatus for supplying a high-voltage load with a high-voltage electric power and a low-voltage load with low-voltage electric power, said apparatus comprising:

a multi-phase AC generator having star-connected armature windings, said armature windings having respective phase-terminals and a common neutral point and generating high-output-voltages at said phase-terminals and a low-output-voltage at said neutral point;

a first rectifier, connected between said respective phase-terminals and said high-voltage load, for full-wave-rectifying said high-output-voltage to be supplied to said high-voltage load, and a second rectifier, connected between said neutral point of said armature windings and said low-voltage load, for rectifying said low-output voltage to be supplied to said low-voltage load separately from said first rectifier, and at the same time as when said first rectifier rectifies said high-output voltage.

2. A generating apparatus according to claim 1 further comprising a field coil disposed in said generator and means for regulating said high-output voltage, wherein said voltage regulating means controls field current in said field coil so that said low-output voltage becomes a first low-value when said high-voltage load is not energized and said high-output voltage becomes a set high value when said high-voltage load is energized.

3. A generating apparatus according to claim 2 further comprising a switch for selectively connecting said first rectifier to one of said high-voltage load and said low-voltage load, wherein said voltage regulating means controls said field current to regulate said high-output voltage to a second low value when said switch connects said first rectifier to said low-voltage load, and controls said field current to regulate said high-output voltage to said set high-value when said switch connects said first rectifier to said high-voltage load.

4. A generating apparatus according to claim 1, wherein said second rectifier comprises a diode which has an anode connected to said neutral point and a cathode connected to said low-voltage load.

5. A generating apparatus according to claim 1, wherein said second means comprises a semiconductor switching element, and said voltage regulating means makes said semiconductor switching element conductive when said neutral point becomes higher than a set voltage.

6. A generating apparatus according to claim 1 further comprising a voltage-setting diode which has an anode connected to a ground terminal of said first means and a cathode connected to said neutral point.

7. A generating apparatus according to claim 1 further comprising a voltage-setting diode which has an anode connected to said neutral point and a cathode connected to an output terminal of said first means.

8. A generating apparatus according to claim 1 further comprising means for on-off controlling output current of said first rectifier to regulate said high-output voltage to a set high value when said high-voltage load is energized.

9. A generating apparatus according to claim 5, wherein at least one group of said semiconductor switching elements are made of one of a group of materials including Si and SiC.

10. A generating apparatus according to claim 8, wherein said generator comprises a permanent magnet rotor.

11. A generating apparatus for supplying a high-voltage load with a high-voltage electric power and a low-voltage load with low-voltage electric power, said apparatus comprising:

a multi-phase AC generator including star-connected armature windings, said armature windings having respective phase-terminals and a common neutral point and generating high-output-voltages at said phase terminals and a low-output-voltage at said neutral point;

a first rectifying unit, connected between said respective phase terminals and said high-voltage load, for full-wave-rectifying said high-output-voltage to be supplied to said high-voltage load, a second rectifying unit, connected between said neutral point and said low-voltage load, for rectifying said low-output voltage to be supplied to said low-voltage load separately from said first rectifying unit and at the same time as when said first rectifying unit rectifies said high-output voltage, and means for supplying leading current, which has phase ahead of a corresponding one of said high-output voltages, to a corresponding one of said armature windings, wherein said first rectifying unit comprises first semiconductor elements connected between said respective phase-terminals and one terminal of said high-voltage load and second semiconductor elements connected between said respective phase terminals and another terminal of said high-voltage load, at least one group of said first and second semiconductor elements includes two-way-switching elements, and said leading current supplying means controls said two-way switching elements to supply corresponding armature windings with said leading current respectively.

12. A generating apparatus according to claim 11 further comprising a field coil disposed in said generator and voltage regulating means for controlling field current supplied to said field coil to control said high-output voltages, wherein said voltage regulating means regulates said high-output voltages to a set low level when said high-voltage load is not energized, and regulates said high-output voltage to a set high level higher than said set low level when said high-voltage load is energized.

13. A generating apparatus according to claim 11, wherein said leading current supplying means supplies said leading current to at least one of said armature windings by short-circuiting one of said semiconductor switching elements when said high-voltage load is energized.

14. A generating apparatus according to claim 12, wherein said leading current is not supplied when said high-voltage load is not energized and said field current does not exceed a set value.

15. A generating apparatus according to claim 12, wherein said leading current is supplied when said high-voltage load is not energized and said field current exceeds a set value.

16. A generating apparatus according to claim 12, further comprising a switch for selectively connecting said first rectifying unit to one of said high-voltage load and said low-voltage load, wherein said voltage regulating means and said means for supplying leading current control one of said field current and said leading current to regulate said high-output voltage to said set low level when said switch is connected to said low-voltage load, and control one of said field current and said leading current to regulate said high-output voltage to said set high level and control output voltage of said second rectifying unit to said set low voltage when said switch is connected to said high-voltage load.

17. A generating apparatus according to claim 12 further comprising a battery connected to said second rectifying unit, wherein said voltage regulating means regulates said high-output voltage so that voltage of said neutral point becomes said set low-voltage when said high-voltage load is energized.

18. A generating apparatus according to claim 12, wherein said voltage regulating means regulates said high-output voltage to said set high-level when said high-voltage load is energized.

19. A generating apparatus according to claim 17, wherein said voltage regulating means regulates said high-output voltage so that voltage of said neutral point becomes said set low-level when a voltage of said battery deviates from a predetermined range.

20. A generating apparatus according to claim 11, wherein said second means comprises a diode which has an anode connected to said neutral point and a cathode connected to a terminal of said low-voltage load.

21. A generating apparatus according to claim 11 further comprising means for on-off controlling output current of said first rectifying unit to regulate said high-output voltage to said set high level when said high-voltage load is energized.

22. A generating apparatus according to claim 21, wherein said generator comprises a permanent magnet rotor.

23. A generating apparatus according to claim 11, wherein at least one group of said semiconductor elements are made of one of a group of materials including Si and SiC.

* * * * *